US008881029B2

(12) United States Patent
Thapa

(10) Patent No.: US 8,881,029 B2
(45) Date of Patent: Nov. 4, 2014

(54) SYSTEMS AND METHODS FOR ASYNCHRONOUSLY JOINING AND LEAVING VIDEO CONFERENCES AND MERGING MULTIPLE VIDEO CONFERENCES

(75) Inventor: Mukund N. Thapa, Palo Alto, CA (US)

(73) Assignee: Optical Fusion, Inc., Palo Alto, CA (US)

( * ) Notice: Subject to any disclaimer, the term of this patent is extended or adjusted under 35 U.S.C. 154(b) by 676 days.

(21) Appl. No.: 12/131,749

(22) Filed: Jun. 2, 2008

(65) Prior Publication Data
US 2009/0089683 A1    Apr. 2, 2009

Related U.S. Application Data

(60) Provisional application No. 60/976,464, filed on Sep. 30, 2007.

(51) Int. Cl.
*G06F 3/00*     (2006.01)
*H04N 7/15*    (2006.01)
*H04N 5/04*    (2006.01)

(52) U.S. Cl.
CPC . *H04N 5/04* (2013.01); *H04N 7/15* (2013.01); *H04N 7/155* (2013.01)
USPC ........................................................ 715/756

(58) Field of Classification Search
CPC .................... H04L 29/06027; H04L 12/1813; H04L 65/403
USPC ........................................................ 715/756
See application file for complete search history.

(56) References Cited

U.S. PATENT DOCUMENTS

| | | | |
|---|---|---|---|
| 4,720,850 A | 1/1988 | Oberlander et al. | |
| 5,689,641 A | 11/1997 | Ludwig et al. | |
| 5,758,079 A * | 5/1998 | Ludwig et al. | ................ 709/204 |
| 5,854,640 A | 12/1998 | North et al. | |
| 5,973,724 A | 10/1999 | Riddle | |
| 6,119,147 A * | 9/2000 | Toomey et al. | ................ 709/204 |
| 6,354,748 B1 | 3/2002 | Vrvilo | |
| 6,405,255 B1 | 6/2002 | Stoltz et al. | |
| 6,501,717 B1 | 12/2002 | Yamazaki | |
| 6,603,450 B1 | 8/2003 | Yamazaki et al. | |
| 6,795,740 B1 | 9/2004 | Chu et al. | |
| 6,836,295 B1 | 12/2004 | Cooper | |
| 6,906,741 B2 | 6/2005 | Canova et al. | |
| 6,940,855 B2 | 9/2005 | Okamura | |

(Continued)

FOREIGN PATENT DOCUMENTS

EP           1 465 193           10/2004

OTHER PUBLICATIONS

Zeng et al., A Grouped Network Video Conference System Based on JMF in Collaborative Design Environment; © 2007; IEEE; 8 pages.*

(Continued)

*Primary Examiner* — Linh K Pham
(74) *Attorney, Agent, or Firm* — Fenwick & West LLP

(57) ABSTRACT

A method (and corresponding system and computer program product) providing control to open video conference is disclosed. One aspect enables participants of a video conference to asynchronously join and leave the video conference. Another aspect enables participants to merge multiple video conferences into a single video conference, or to split a single video conference into multiple video conferences.

17 Claims, 35 Drawing Sheets

(56) References Cited

U.S. PATENT DOCUMENTS

| | | | |
|---|---|---|---|
| 6,972,786 | B1 | 12/2005 | Ludwig |
| 7,369,699 | B1 | 5/2008 | Christie |
| 7,526,525 | B2 | 4/2009 | Hagale et al. |
| 7,559,031 | B2* | 7/2009 | Kawamura et al. ............ 715/753 |
| 7,592,532 | B2 | 9/2009 | Coleman |
| 7,617,280 | B1 | 11/2009 | Webster et al. |
| 7,620,410 | B2 | 11/2009 | Takizawa et al. |
| 7,672,742 | B2 | 3/2010 | Ng et al. |
| 8,060,366 | B1 | 11/2011 | Maganti et al. |
| 8,081,205 | B2 | 12/2011 | Baird et al. |
| 8,213,503 | B2 | 7/2012 | Tu et al. |
| 8,214,516 | B2 | 7/2012 | Gupta et al. |
| 8,335,576 | B1 | 12/2012 | Bradshaw et al. |
| 2002/0055796 | A1 | 5/2002 | Katayama et al. |
| 2002/0145610 | A1 | 10/2002 | Barilovits et al. |
| 2002/0194054 | A1* | 12/2002 | Frengut ........................ 705/10 |
| 2003/0035371 | A1 | 2/2003 | Reed et al. |
| 2003/0043260 | A1 | 3/2003 | Yap et al. |
| 2003/0174826 | A1* | 9/2003 | Hesse ..................... 379/210.01 |
| 2004/0008249 | A1* | 1/2004 | Nelson et al. .............. 348/14.09 |
| 2004/0008635 | A1 | 1/2004 | Nelson et al. |
| 2004/0028199 | A1* | 2/2004 | Carlson ..................... 379/93.21 |
| 2004/0119814 | A1 | 6/2004 | Clisham et al. |
| 2004/0141528 | A1 | 7/2004 | LeBlanc et al. |
| 2004/0223464 | A1* | 11/2004 | Dye et al. ...................... 370/260 |
| 2004/0258047 | A1 | 12/2004 | Miao |
| 2005/0073575 | A1 | 4/2005 | Thacher et al. |
| 2005/0081160 | A1* | 4/2005 | Wee et al. ..................... 715/755 |
| 2005/0085935 | A1 | 4/2005 | Ide |
| 2005/0099492 | A1* | 5/2005 | Orr ............................. 348/14.08 |
| 2005/0213739 | A1 | 9/2005 | Rodman et al. |
| 2005/0237377 | A1 | 10/2005 | Chapweske et al. |
| 2005/0248652 | A1 | 11/2005 | Firestone et al. |
| 2005/0256925 | A1* | 11/2005 | Luo et al. ...................... 709/204 |
| 2005/0259754 | A1 | 11/2005 | Ho et al. |
| 2005/0276282 | A1 | 12/2005 | Wells et al. |
| 2006/0002681 | A1 | 1/2006 | Spilo et al. |
| 2006/0031290 | A1* | 2/2006 | Mannaru et al. .............. 709/204 |
| 2006/0050155 | A1 | 3/2006 | Ing et al. |
| 2006/0062368 | A1 | 3/2006 | Saha et al. |
| 2006/0104347 | A1 | 5/2006 | Callan et al. |
| 2006/0129909 | A1 | 6/2006 | Butt et al. |
| 2006/0244812 | A1* | 11/2006 | Jeong et al. .................. 348/14.1 |
| 2006/0244819 | A1* | 11/2006 | Pun et al. .................... 348/14.09 |
| 2007/0121530 | A1* | 5/2007 | Vadlakonda et al. ......... 370/260 |
| 2007/0203596 | A1 | 8/2007 | Huang et al. |
| 2007/0206089 | A1 | 9/2007 | Eshkoli et al. |
| 2007/0283403 | A1 | 12/2007 | Eklund et al. |
| 2008/0016156 | A1* | 1/2008 | Miceli et al. .................. 709/204 |
| 2008/0037580 | A1 | 2/2008 | Shaffer et al. |
| 2008/0037749 | A1 | 2/2008 | Metzger et al. |
| 2008/0100694 | A1* | 5/2008 | Barkley et al. ............. 348/14.08 |
| 2008/0117838 | A1 | 5/2008 | Yee et al. |
| 2008/0291891 | A1 | 11/2008 | Jerlhagen et al. |

OTHER PUBLICATIONS

Liang et al., Design, Implementation and Performance Measurement of Multi-Point Video-Conference Bridge (MPVCB) over ATM Switch; © 1994; IEEE; 5 pages.*

PCT International Search Report and Written Opinion, PCT/US08/78203, Dec. 2, 2008, 8 pages.

PCT International Search Report and Written Opinion, PCT/US08/78196, Dec. 2, 2008, 10 pages.

PCT International Search Report and Written Opinion, PCT/US08/78206, Dec. 2, 2008, 7 pages.

PCT International Search Report and Written Opinion, PCT/US08/78326, Dec. 12, 2008, 8 pages.

Singh, K.N., "Reliable, Scalable and Interoperable Internet Telephony," Columbia University Thesis, 2006, copyright 2006, [Online] [Retrieved on Nov. 23, 2008] Retrieved from the Internet<URL:http://www1.cs.columbia.edu/-kns10/publication/thesis.pdf>.

United States Office Action, U.S. Appl. No. 12/130,998, Jan. 28, 2014, eighteen pages.

United States Office Action, U.S. Appl. No. 13/304,105, Feb. 10, 2014, fourteen pages.

Boucher, J.A. et al., "Design and Performance of a Multi-Stream MPEG-I System Layer Encoder/Player," *In Proceedings of Multimedia Computing and Networking, IS&T/SPIE Symposium on Electronic Imaging Science and Technology*, Feb. 1995, eighteen pages, vol. 2417.

International Telecommunication Union, "Call signaling protocols and media stream packetization for packet-based multimedia communication systems," 2000, ITU-T Recommendation H.225.0, two hundred fifty-one pages.

International Telecommunication Union, "Packet-based multimedia communications systems. Annex R: Robustness methods for H.323 entities," 2001, ITU-T Recommendation H.323, thirty pages.

Final Rejection for U.S. Appl. No. 12/130,998, dated Jul. 30, 2012, 18 pages.

\* cited by examiner

SYSTEMS AND METHODS FOR ASYNCHRONOUSLY JOINING AND LEAVING VIDEO CONFERENCES AND MERGING MULTIPLE VIDEO CONFERENCES

CROSS REFERENCE TO RELATED APPLICATIONS

This application claims the benefit of U.S. Provisional Application No. 60/976,464, "Video Conference User Interface and Features" by Mukund N. Thapa filed on Sep. 30, 2007, and which is incorporated by reference herein in its entirety.

BACKGROUND OF THE INVENTION

1. Field of the Invention

The present invention relates generally to video conferencing over a network. In particular, the present invention is directed towards systems and methods for participants to join and leave video conferences and to merge multiple video conferences using such video conferencing systems.

2. Description of Background Art

Conventional video conferencing technologies are generally cumbersome and unnatural for users. They can also require specialized equipment or connections, thus making the video conference expensive and limiting participation only to those who have the specialized equipment and connections. For example, it is not unusual for video conferencing capabilities within a company to be based on a specialized system. The company spends a significant amount of money to purchase a limited number of specialized video conferencing equipment. This equipment is set up by the company's IT staff in specific rooms that support video conferencing. Groups who desire to have a video conference then book these rooms in advance. Details of the video conference are given to the IT staff, who make the necessary preparations in advance. At the scheduled time and only at the scheduled time, the video conference takes place, if there are no problems. If there are problems, everyone waits around until IT fixes the problem. In addition, the video conferencing service may require access to special data networks, for which the company must pay additional fees.

In addition to the above restrictions, conventional video conferencing technologies also provide users with very limited controls over video conference calls. For example, individuals who are not scheduled in advance to participate in the video conference, may not be able to join the video conference in progress. Furthermore, if a participant leaves a video conference, that participant may not be able to rejoin the video conference without significant interruption to the other participants (e.g., restarting the video conference). Also, a participant of multiple video conferences typically does not have the capability to merge them into one video conference.

Thus, there is a need for additional video conferencing capabilities, including capabilities such as asynchronously joining and/or leaving video conferences, and merging multiple video conferences. It is also desirable for these capabilities to be simple to use.

SUMMARY OF THE INVENTION

The present invention overcomes limitations of the prior art by providing an open video conference architecture. This allows users to asynchronously join and/or leave a video conference in a simple and intuitive manner. It can also provide the ability to merge multiple video conferences, again in a simple and intuitive manner.

In one aspect, a caller makes an initial video conference call to one or more called parties. A video conference is established with those who accepted the initial video conference call. Subsequently, a non-participant can join the previously established video conference by making a second video conference call between the non-participant and one of the existing participants. When the second video conference call is accepted, the non-participant joins the previously established video conference and becomes a participant. The second video conference call can be initiated by either the non-participant or the participant.

In another aspect, two or more concurrent video conferences can be combined into a single video conference by having a common participant merge the two video conferences. In one implementation, the participant does so by dragging the window for one video conference and dropping onto the window for the other video conference. In another implementation, instead of dragging and dropping the video conference window, the participant merges two video conferences by dragging a tree node on a control panel (also known as the communicator) representing one video conference and dropping onto a tree node representing the other. In case the two video conferences to be merged have no common participant, the merger is accomplished by making a bridging video conference call between participants in the video conferences. For example, participant A of video conference A makes the bridging video conference call to participant B of video conference B, and this initiates the process for merging video conferences A and B into a single combined video conference. Participants of the individual video conferences become participants of the combined video conference.

In another aspect, an existing video conference can be split into multiple video conferences, for example by selecting a subset of participants and then initiating the split. Alternatively, a subset of participants can be selected and requested or forced to leave the existing video conference.

Other aspects of the invention include software, systems and components of systems for implementing the techniques described above. Yet additional aspects include methods and applications for all of the foregoing.

DETAILED DESCRIPTION OF THE PREFERRED EMBODIMENTS

Overview

Embodiments of the present disclosure provide methods (and corresponding systems and computer program products)

for operating open video conferences. The video conference is open in the sense that users can asynchronously join, leave, and/or merge with other video conferences. It is also open in the sense that various embodiments may avoid or mitigate many of the disadvantages associated with the prior art proprietary or closed systems (e.g., requiring dedicated proprietary equipment and/or network connections, requiring scheduling of video conferences and/or the identification of participants well in advance of the actual video conferences, requiring specialized or expert technical support).

The methods for operating open video conferences can be implemented through a server-based video conferencing architecture, an example of which is described in detail below with regard to FIG. 1. One skilled in the art would readily understand that the present disclosure is not restricted to this architecture, and can be implemented in other architectures such as peer-to-peer architecture.

Architecture of a Multi-Point Multi-Person Video Conferencing System

Figure 1:
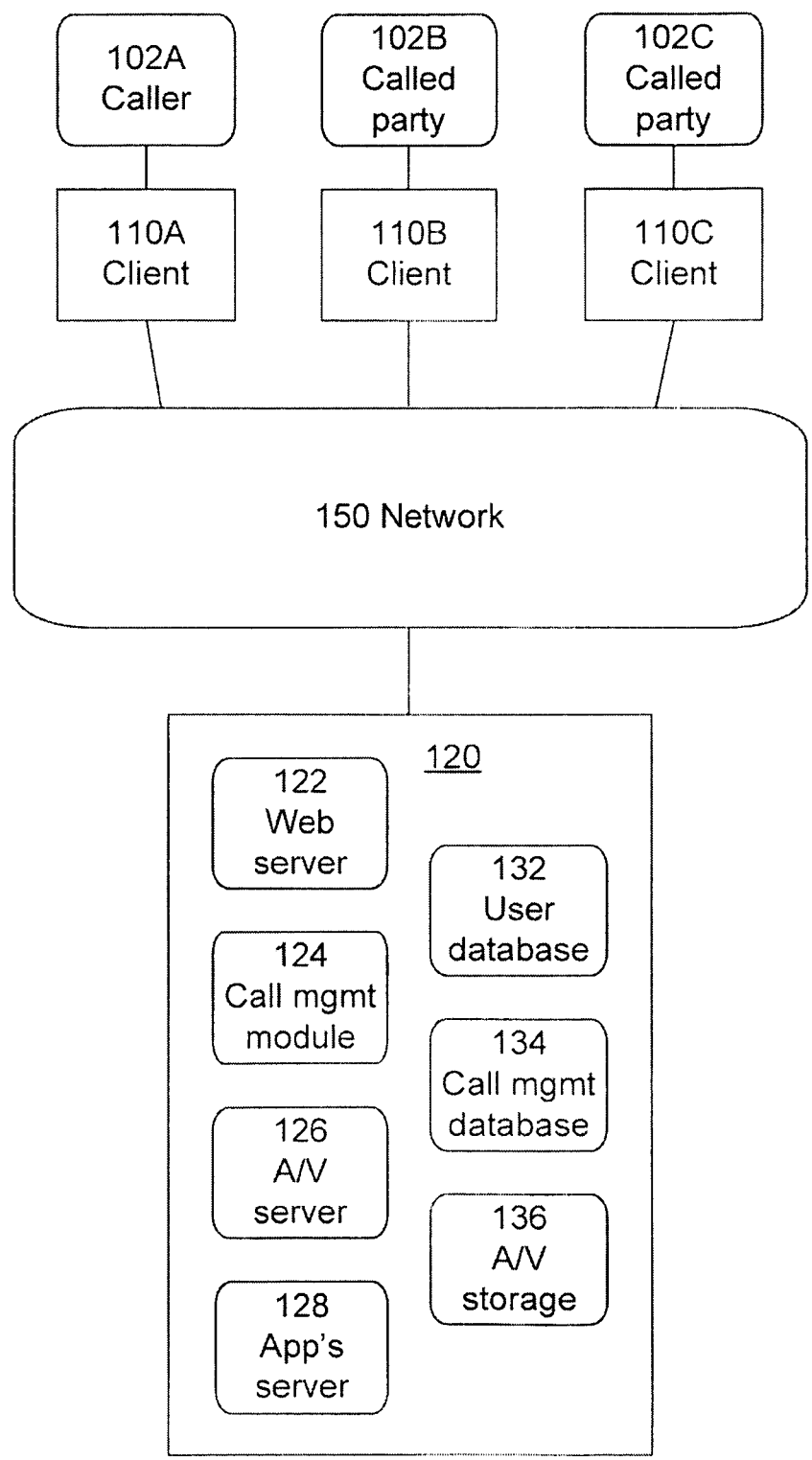
FIG. 1 is a block diagram of a server-based architecture suitable for use with the invention.

FIG. 1 is a block diagram of a server-based video conferencing architecture for a multi-point multi-person video conferencing system suitable for use with the invention. In this example, a participant 102A desires to have a video conference with two other participants 102B,102C. For convenience, participant 102A will be referred to as the caller and participants 102B,102C as the called parties. The caller 102A initiates the video conference by making an initial video conference call to the called parties 102B,102C. The called parties 102B,102C join the video conference by accepting caller 102A's video conference call.

Each participant 102 is operating a client device 110, which connects via a network 150 to a central server 120. The network 150 may be a wired or wireless network. Examples of the network 150 include the Internet, an intranet, a WiFi network, a WiMAX network, a mobile telephone network, or a combination thereof. In this server-based architecture, the server 120 coordinates the set up and the tear down of the video conference. In this particular example, each client device 110 is a computer that runs client software with video conferencing capability. To allow full video and audio capability, each client device 110 includes a camera (for video capture), a display (for video play back), a microphone (for audio capture) and a speaker (for audio play back).

The client devices 110 are connected via the network 150 to the central server 120. In this example, the central server 120 includes a web server 122, a call management module 124, an audio/video server 126 and an applications server 128. The server 120 also includes user database 132, call management database 134 and audio/video storage 136. The participants 102 have previously registered and their records are stored in user database 132. The web server 122 handles the web interface to the client devices 110. The call management module 124 and call management database 134 manage the video conference calls, including the set up and tear down of video conferences. For example, the call management database 134 includes records of who is currently participating on which video conferences. It may also include records of who is currently logged in and available for video conference calls, their port information, and/or their video conferencing capabilities. The audio/video server 126 manages the audio streams, the video streams, and/or the text streams (collectively called media streams) for these video conferences. Streaming technologies, as well as other technologies, can be used. Storage of audio and video at the server is handled by audio/video storage 136. The application server 128 invokes other applications (not shown) as required.

Process for Initiating a Video Conference

Figure 2B:
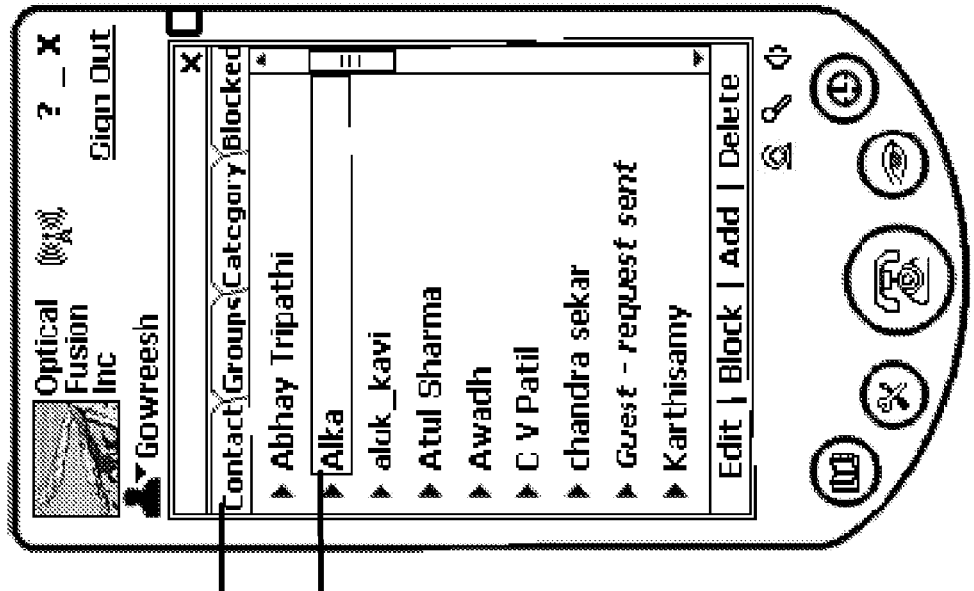
FIGS. 2A-2I are a series of screen shots illustrating a process for a user to initiate a video conference.
Figure 2A:
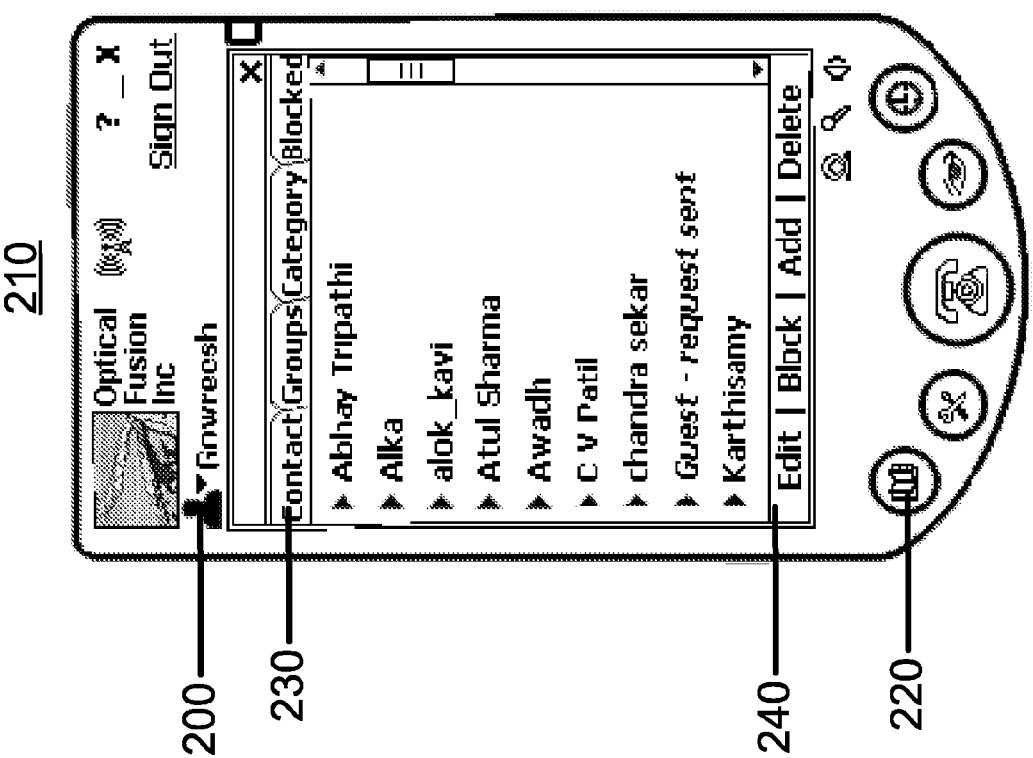

FIGS. 2A-2I are a series of user interface screen shots illustrating a process for a user to initiate a video conference using the system shown in FIG. 1. FIG. 2A is a screen shot of the top level of the user interface. The main part of the user interface will be referred to as the main communicator element 210. It includes top level controls for video conferencing. These controls typically are either displayed as graphical elements or implemented as part of pull-down menus (or other similar user interface components). In this example, the buttons 220, tabs 230 and toolbar 240 are some of the controls. The user in this example is Gowreesh, as indicated by 200.

Figure 2D:
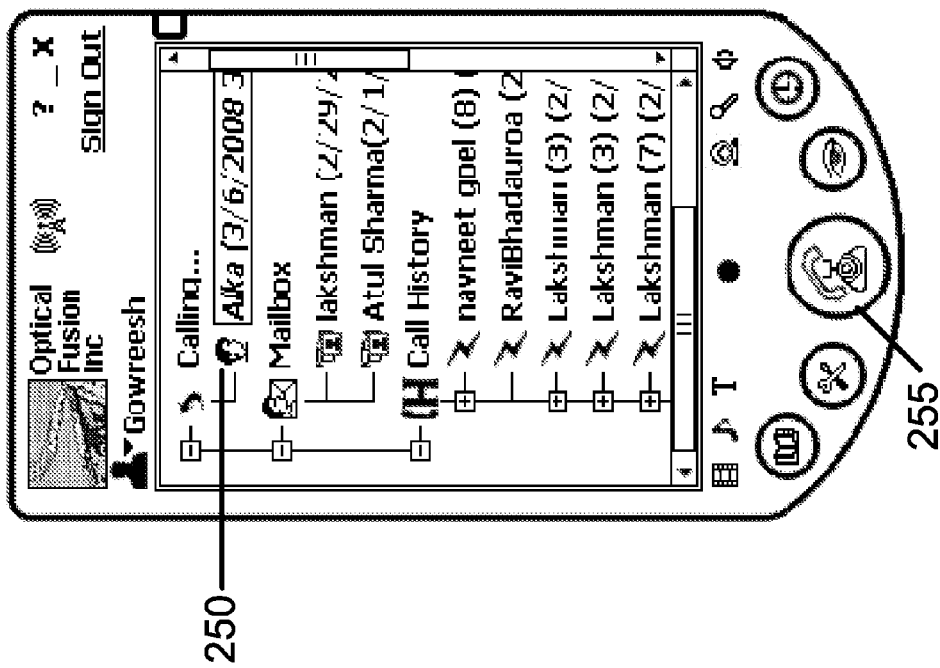
Figure 2C:
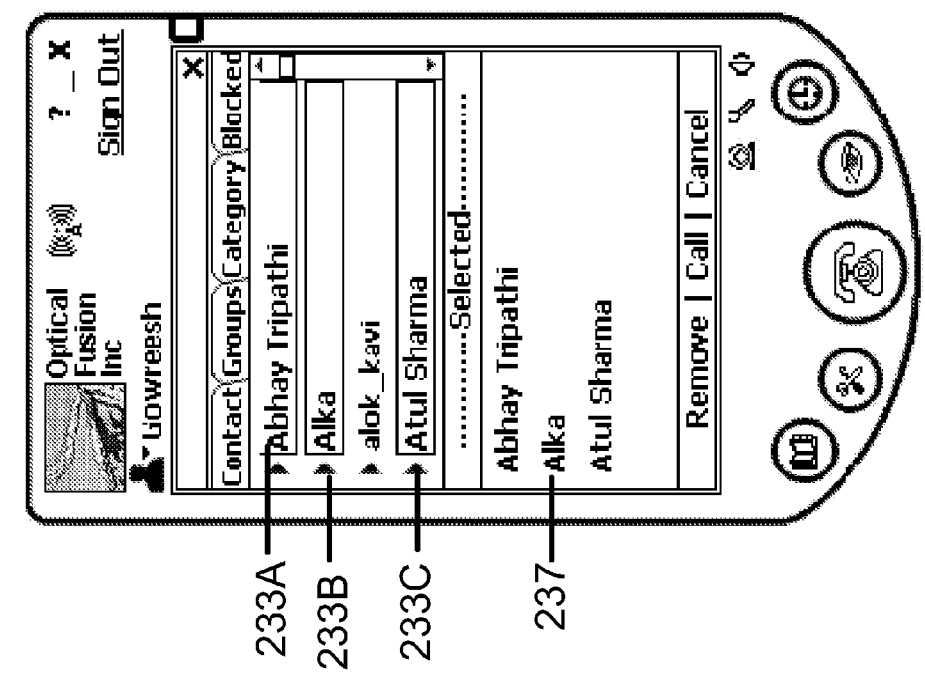

To begin the video conference initiation process, the caller 102A selects the other participants 102B,102C (also called "called parties") for the video conference. In FIGS. 2B and 2C, the caller 102A selects the other participants 102B,102C from his address book (tab 232). In FIG. 2B, the caller 102A (Gowreesh) is selecting Alka 233, as shown by the highlighting of this contact. In FIG. 2C, the caller Gowreesh has selected multiple other participants: Abhay, Alka and Atul, as indicated by the highlighted contacts 233A,B,C. The currently selected participants are also shown in area 237. When the caller is finished selecting participants, the caller makes an initial video conference call, which sends the list of selected participants from client 110A to the server 120.

The caller 102A makes the initial video conference call by activating the call button 255, which is prominently placed due to its importance. FIG. 2D shows a screen shot where the caller's communicator 210 has an indication 250 that a video conference call is being placed to Alka. Naturally, although FIG. 2D shows a video conference call being placed only to Alka, the video conference call can be placed to more than one person at a time.

The server 120 begins to set up the video conference call by creating an entry for the new video conference in a conference table (also known as the call table) within the call management database 134. In one implementation, this entry includes a unique conference ID to identify the new video conference, possibly a conference name, a conference type (public, private, or hidden), and a conference administrative ID corresponding to the caller 102A. The server 120 also inserts the list of participant ID's into the conference entry, in this example implementation by use of a user table that includes conference ID, user ID, and A/V capability (e.g., audio, video and/or text). The server 120 obtains the IP address, login port number and session ID for participants from a table of logged in users, which may also be maintained as part of the call management database 134 (or the user database 132).

Figure 2E:
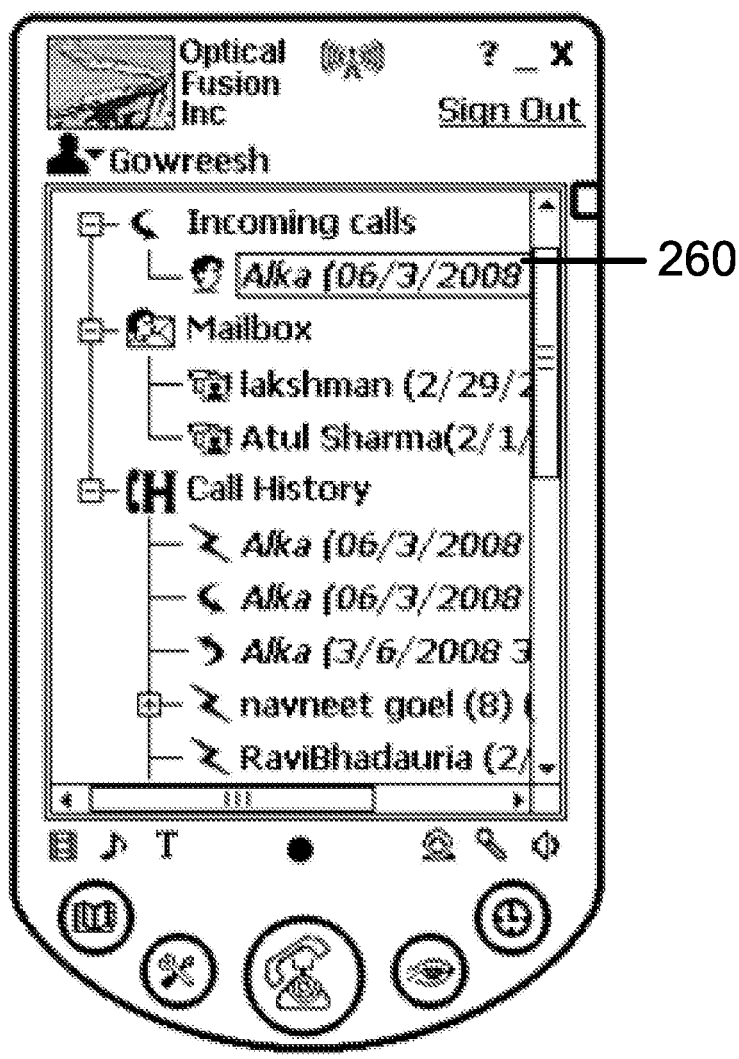

Assuming the called parties 102B,102C are logged on, the server 120 sends an initial request to their client devices 110B,110C. This could be in the form of a ring, for example. FIG. 2E shows a screen shot of a called party receiving notification 260 of an incoming video conference call. Note that, in this example, Gowreesh and Alka have changed roles. FIG. 2E still shows Gowreesh's communicator. However, Alka is the caller and Gowreesh is the called party. The communicator shows 260 that Alka is calling Gowreesh.

Figure 2F:
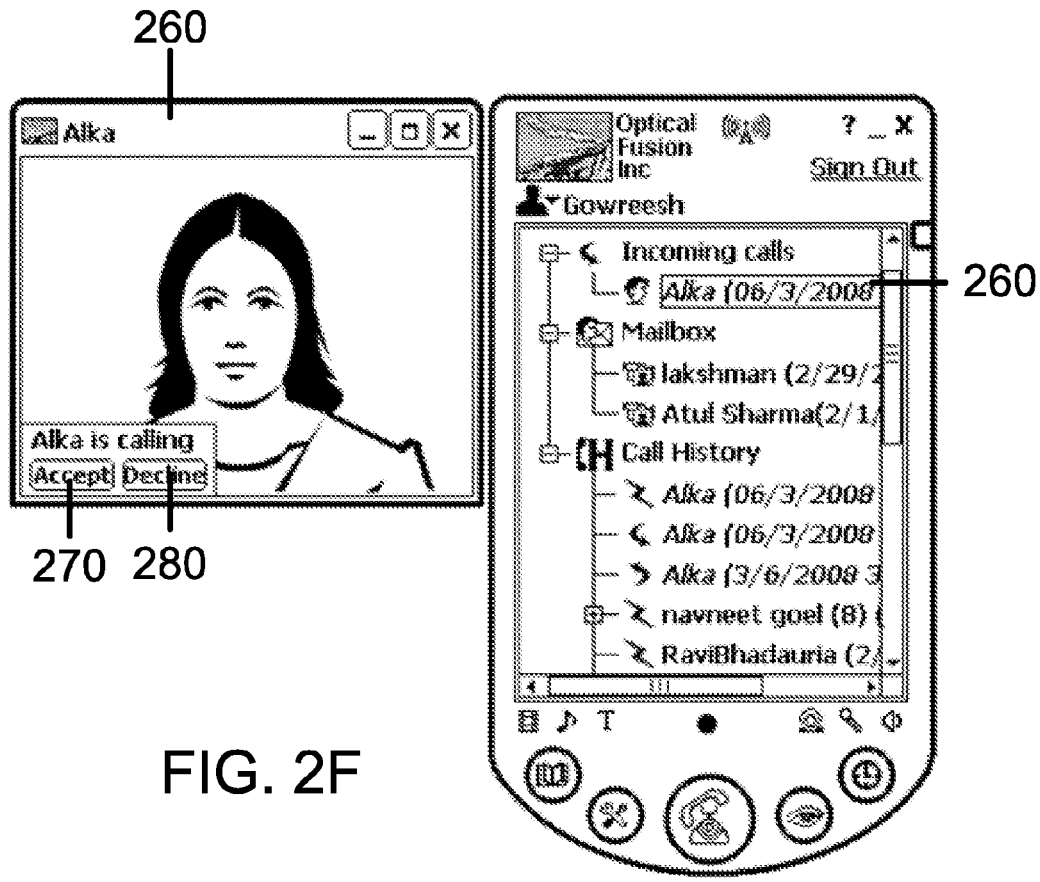

In FIG. 2F, the notification 260 also includes a window showing the caller. The called party can accept the video conference call and join the video conference by activating the accept button 270. Once the called party joins the video conference, the other participants 102 are made aware of his presence. At the server 120, the conference table is updated to include the participants 102 that accepted. As a result, the server 120 now routes the media streams (e.g., video, audio, and/or text) to and from the new participants 102.

Figure 2G:
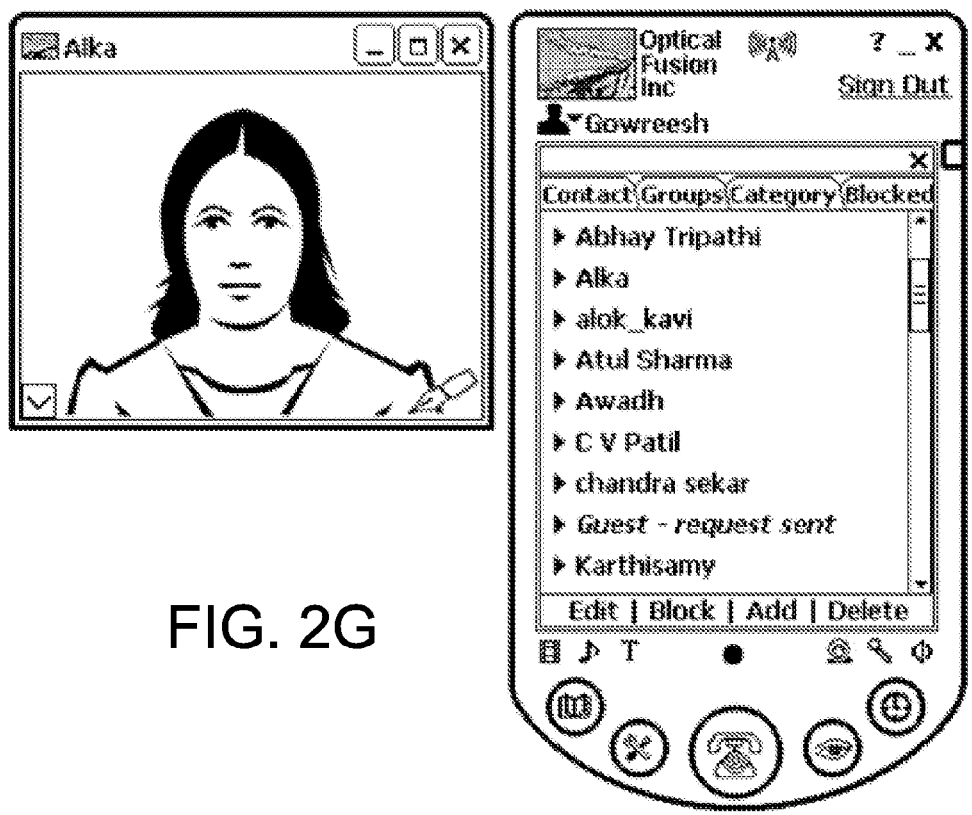
Figure 2H:
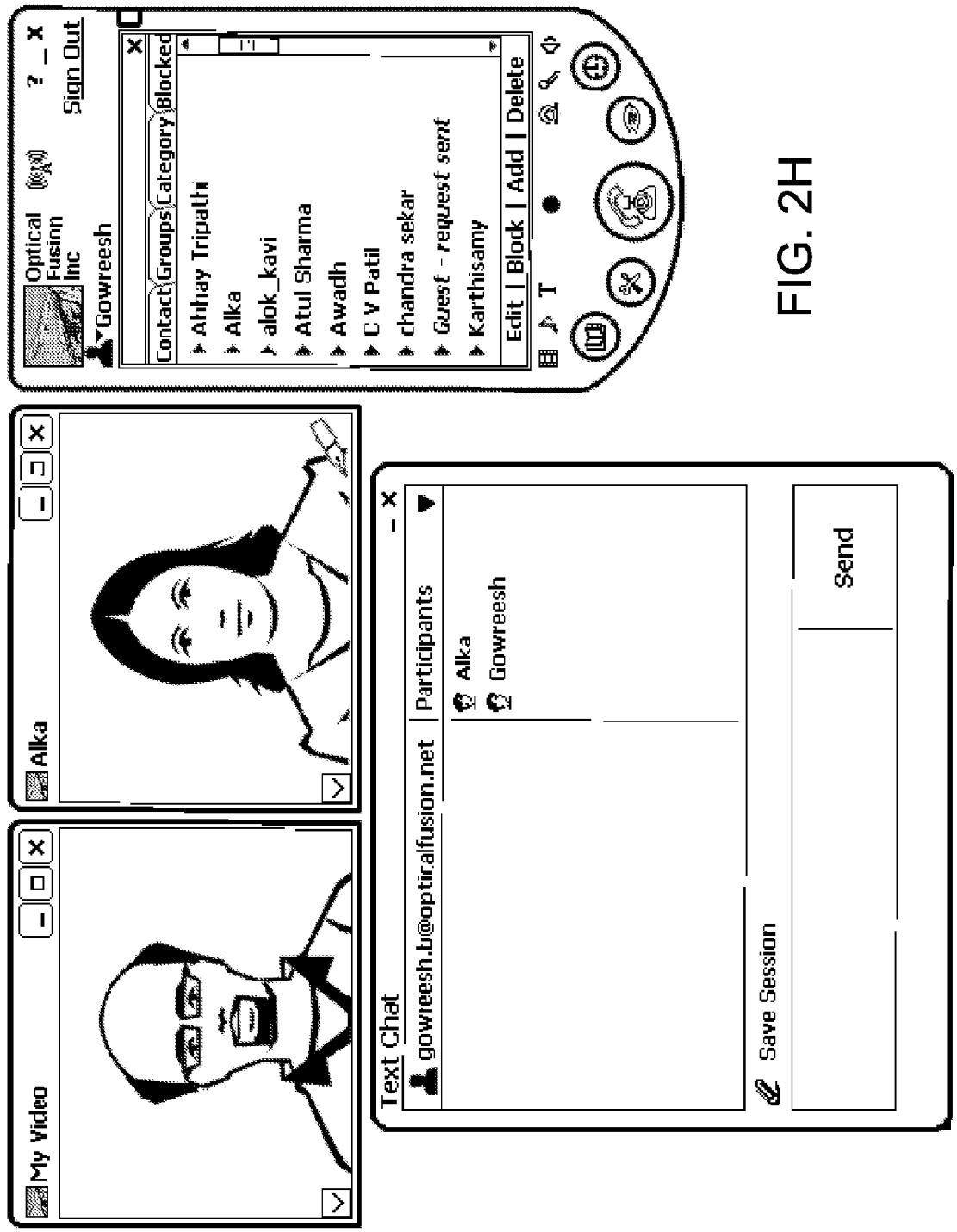
Figure 2I:
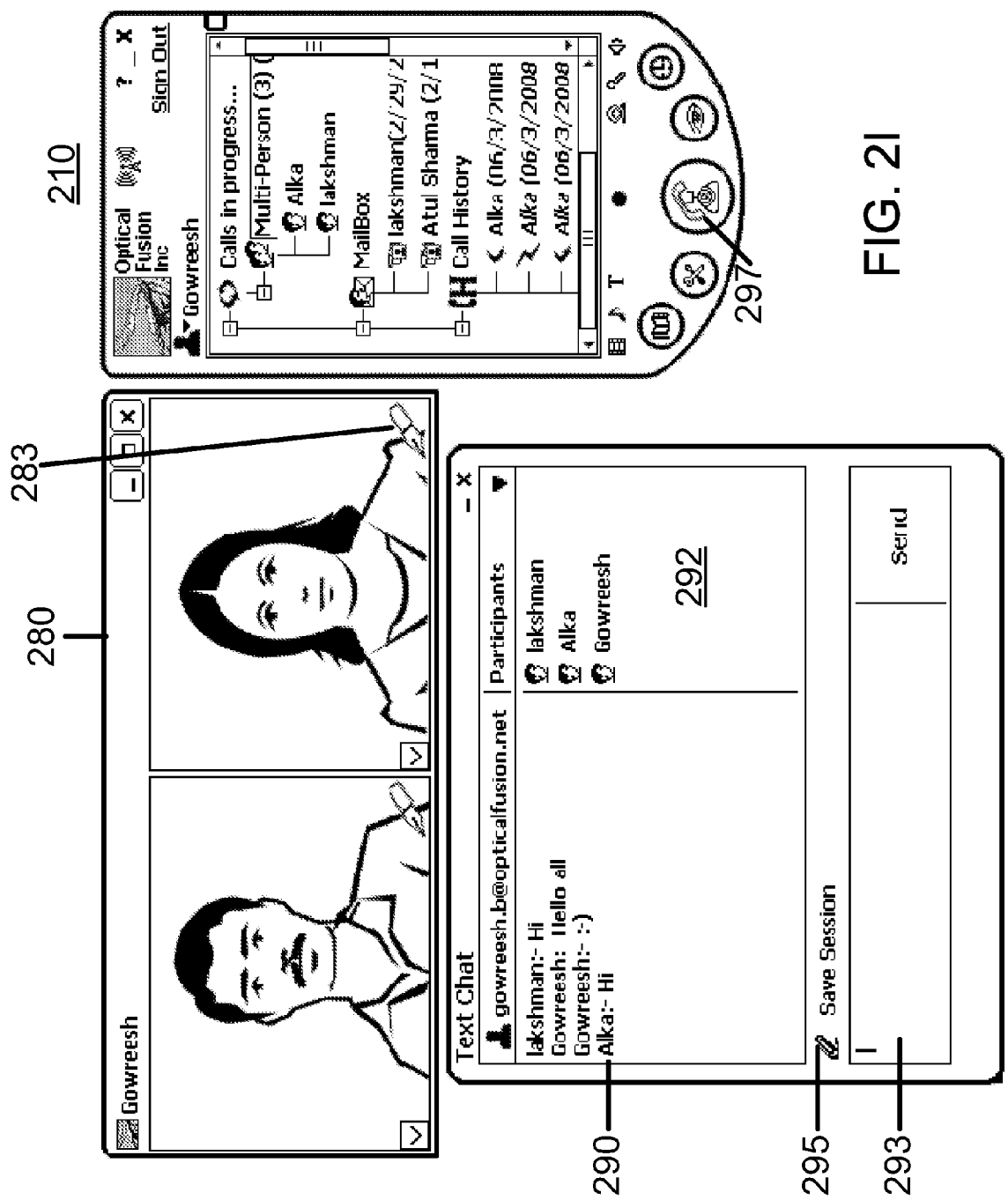

FIGS. 2G-2I show screen shots of a video conference. In FIG. 2G, there is one other participant, Alka, in addition to the caller Gowreesh. FIG. 2H is an alternate interface that shows Gowreesh in addition to Alka. In FIG. 2I, a third participant Lakshman has joined the video conference. FIG. 2I shows the main communicator element 210, a video conference window 280 that shows both of the other participants, and a third window 290.

This ancillary window 290 displays a list of the current participants 102 and also provides for text chat. The participant's text chat is entered in area 293. Text chat can be shared between all participants or only between some participants (i.e., private conversations). The participant can initiate private communications or send private text messages by clicking on the pen icon. For example, Gowreesh's clicking on Alka's pen icon 283 establishes text chat between Alka and Gowreesh. In addition to text, files can also be shared by clicking on the attachment icon 295. Text chat and attachments can be saved.

Similarly, the called party can decline the video conference call by clicking the decline button 280, as shown in FIG. 2F. The corresponding client device 110 sends a notification to the server 120 reporting the declination. The server 120 updates the conference table and notifies the other participants 102 of the declination. When a called party declines the video conference call or is not logged in to the server 120, the server 120 can provide a videomail service to the caller. The caller can then leave a videomail message for the called party.

FIGS. 2A-2I illustrate one example, but the invention is not limited to these specifics. For example, the video conference can be previously scheduled by a participant 102 or a non-participating user. The server 120 initiates the scheduled video conference by sending an initial request to all scheduled participants 102 at the scheduled date and time. As another example, client devices 110 other than a computer running client software can be used. Examples include PDAs, mobile phones, web-enabled TV, and SIP phones and terminals (i.e., phone-type devices using the SIP protocol that typically have a small video screen and audio capability). In addition, not every client device 110 need have both audio and video and both input and output. Some participants 102 may participate with audio only or video only, or be able to receive but not send audio/video or vice versa. The underlying architecture also need not be server-based. It could be peer-to-peer, or a combination of server and peer-to-peer. For example, participants that share a local network may communicate with each other on a peer-to-peer basis, but communicate with other participants via a server. The underlying signaling protocol may be a proprietary protocol or a standard protocol such as Session Initiation Protocol (SIP). Other variations will be apparent.

Process for Asynchronously Joining a Video Conference

Non-participating users of a previously established video conference can join the video conference in a simple and intuitive manner without significantly interrupting the existing participants' attendance. FIGS. 3A-3F are a series of user interface screen shots illustrating a process for a non-participant to join an established video conference through a video conference call with a participant. For convenience, the process is described using the system and example shown in FIG. 1.

Figure 3A:
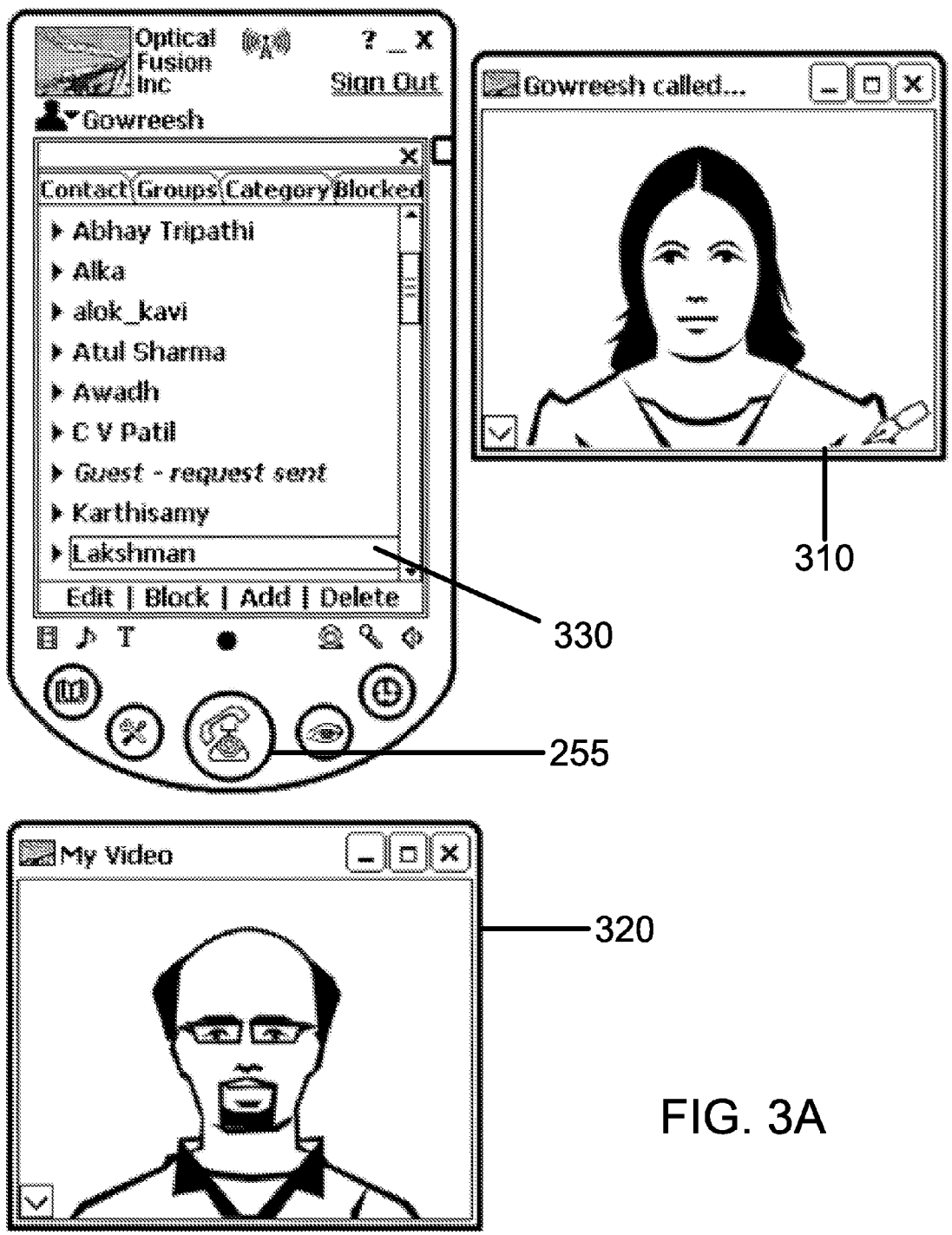
FIGS. 3A-3F are a series of screen shots illustrating a process for a non-participant to join an established video conference through a video conference call with a participant.

A video conference can be initiated, for example, according to the process described above with respect to FIGS. 2A-2I. FIG. 3A shows a screen shot of Gowreesh's client device. As shown, Gowreesh is having a video conference with Alka. Gowreesh's client device displays a window 310 playing live video of Alka captured by Alka's client device, and a window 320 playing video of himself. Assume that this conference runs for a while and then one of the participants (Gowreesh in this example) would like to include Lakshman in the video conference. Gowreesh calls Lakshman by first selecting Lakshman 330 from his address book and then activates the call button 255. When Gowreesh activates the call button 255, his client device 110 sends the list of selected participants, in this case, Lakshman, to the server 120.

Figure 3B:
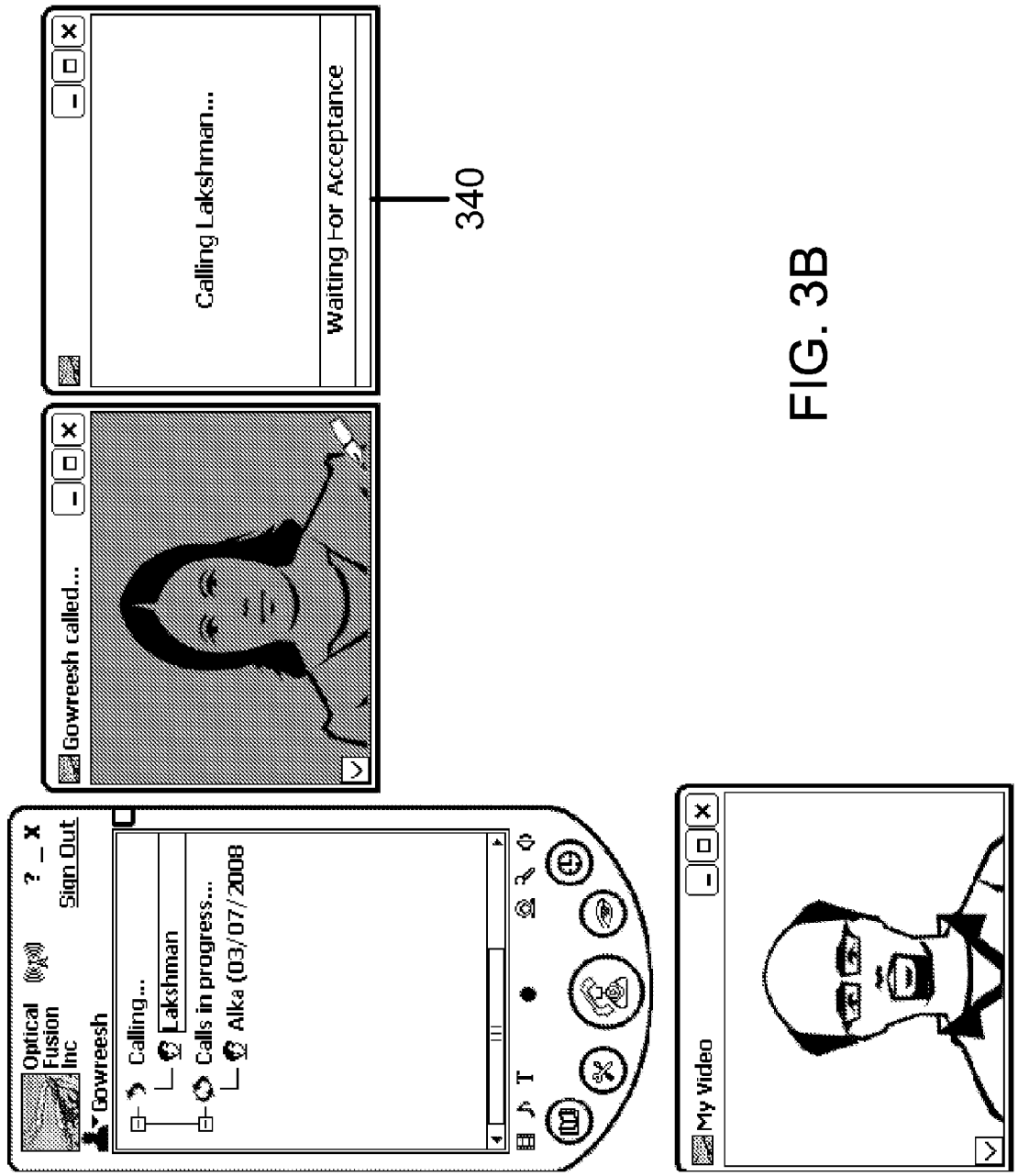

Similar to the process for initiating a video conference as described above with reference to FIGS. 2A-2I, the server 120 begins to set up a video conference between Gowreesh and Lakshman by creating an entry for it in the conference table, and sends a request to Lakshman's client device 110. FIG. 3B shows a screen shot of Gowreesh's client device showing him having the video conference with Alka while waiting for Lakshman to respond. As shown, Gowreesh's client device displays a new window 340 for Lakshman. The window 340 shows that Gowreesh is calling Lakshman and waiting for Lakshman to accept the call.

Figure 3C:
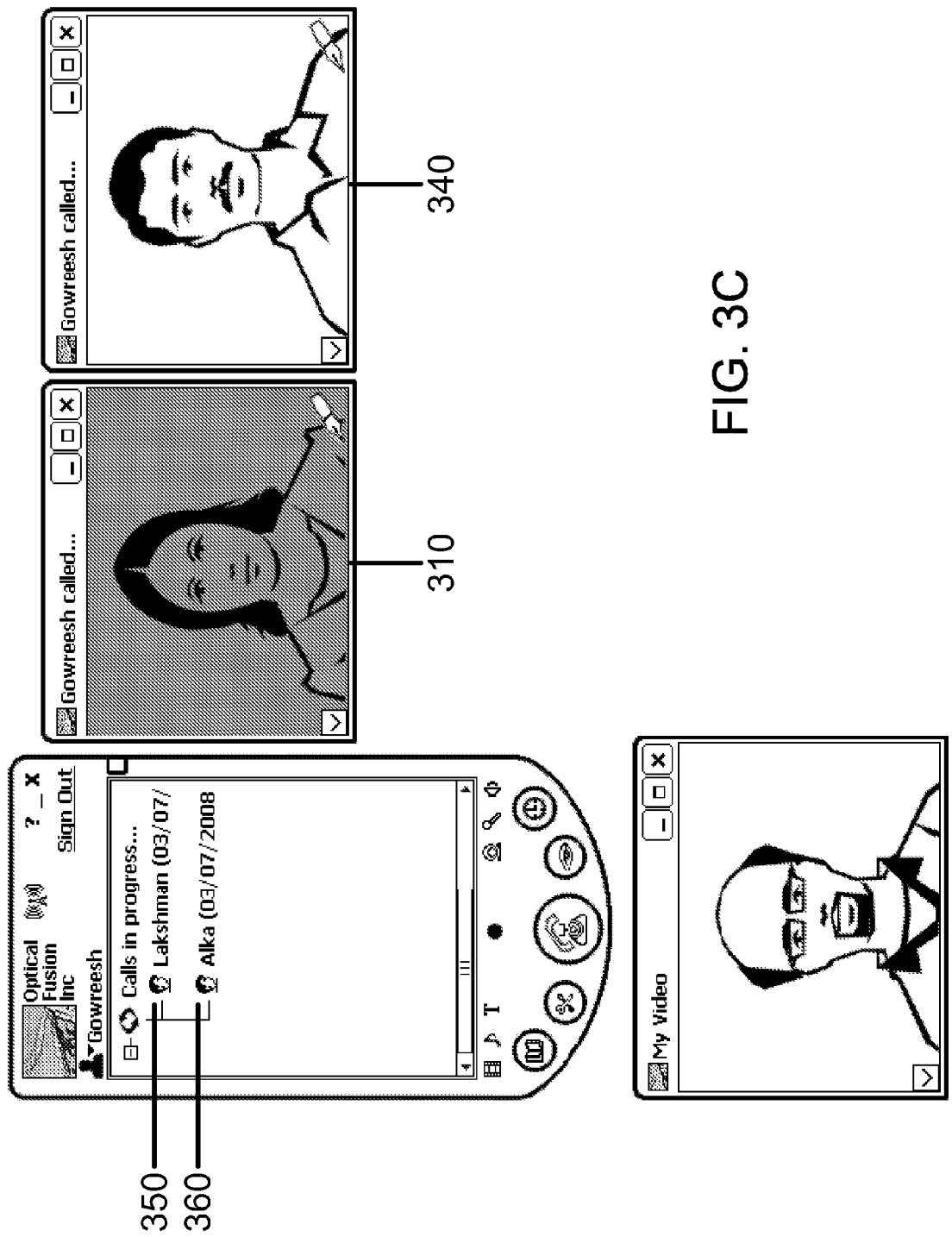

Assuming Lakshman is logged on and accepts the call, he and Gowreesh both join the newly established video conference. For clarity, the video conference between Gowreesh and Alka will be referred to as the first video conference and the video conference between Gowreesh and Lakshman the second video conference. As soon as the second video conference is established, Lakshman's video will be displayed on the window 340, as illustrated in the screen shot shown in FIG. 3C. In addition, Gowreesh's communicator displays a tree view of on-going video conferences including a tree node 360 for the first video conference and a tree node 350 for the second video conference. In one embodiment, a user can only actively participate in one video conference (hereinafter called the active video conference) and leave the other video conferences on hold. As shown in FIG. 3C, the window 310 and the tree node 360 are shaded, indicating that the first video conference is currently on hold. It is noted that in alternate embodiments a user can actively participate in multiple video conferences concurrently.

Figure 3D:
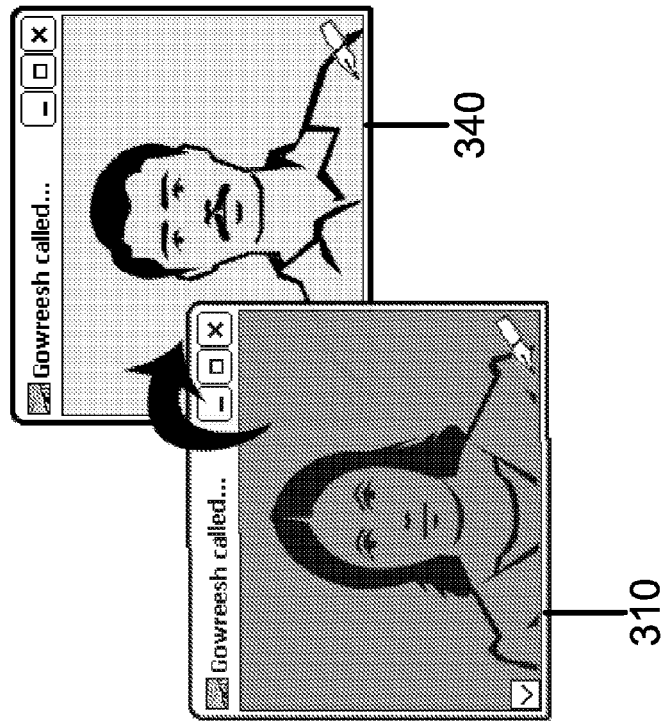
Figure 3D:
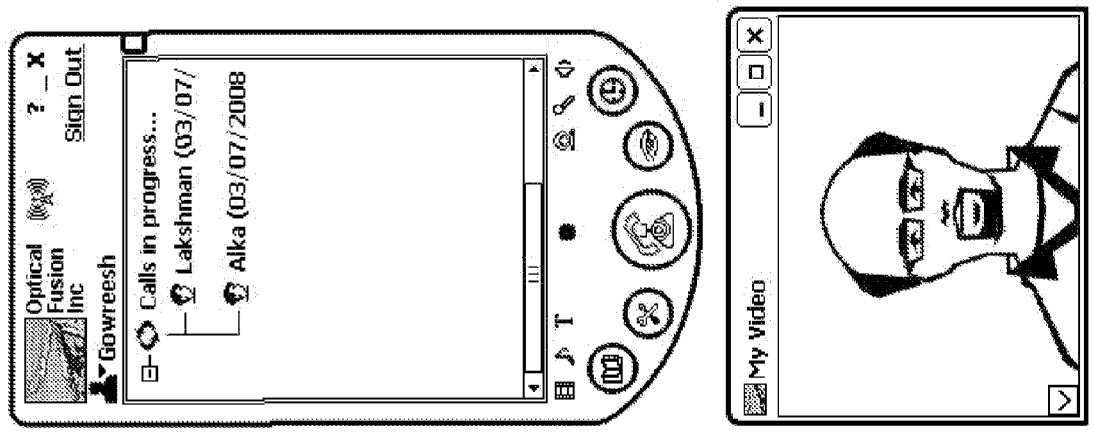
Figure 3E:
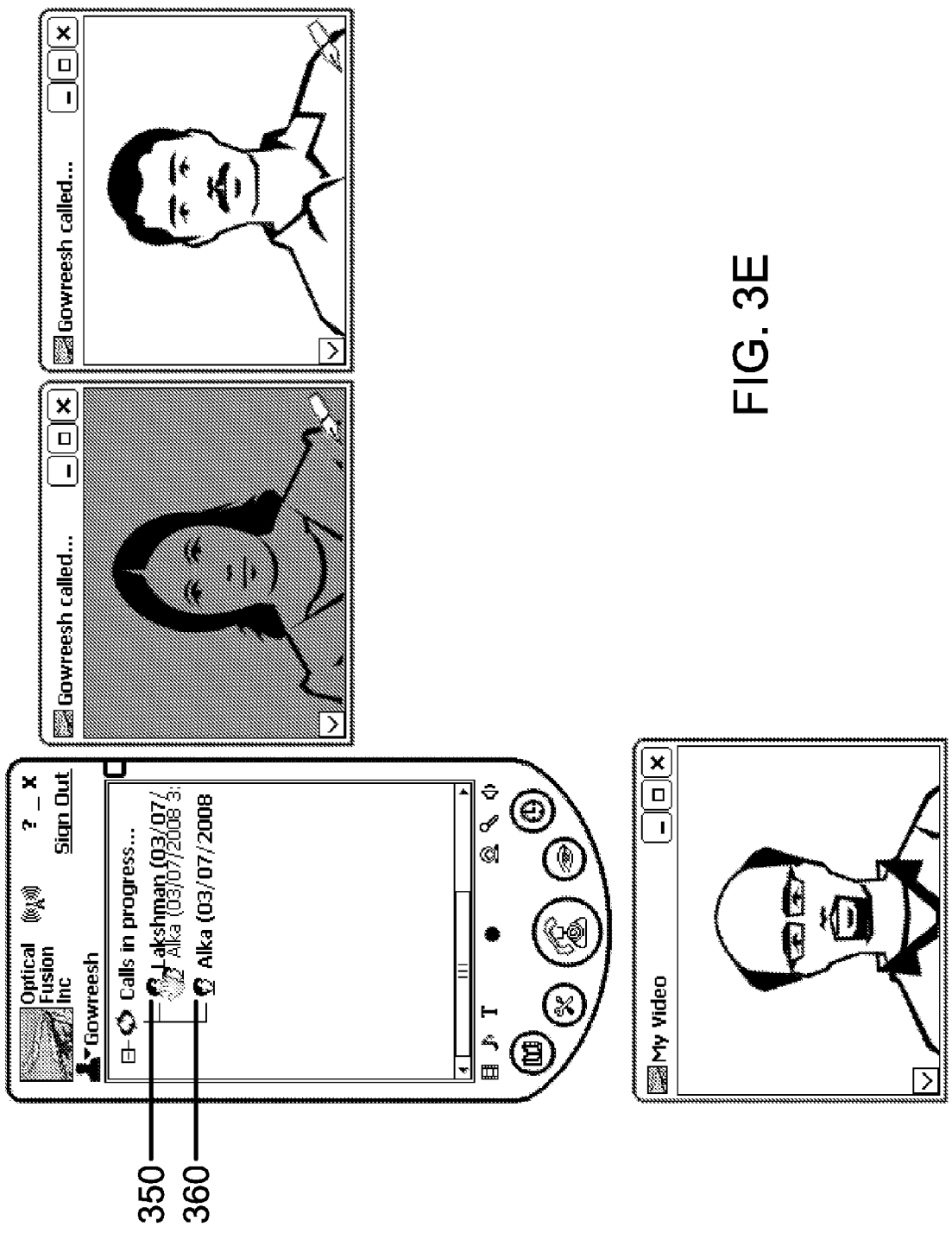

Thereafter, Gowreesh can include Lakshman into the first video conference to join him and Alka. Gowreesh can include Lakshman by selecting the window 340 and dragging it onto the window 310. Alternatively, Gowreesh can drag and drop the window 310, as illustrated in FIG. 3D. In one implementation, instead of dragging and dropping windows representing the video conferences, Gowreesh can achieve the same effect by dragging the tree node 360 and dropping onto the tree node 350, as illustrated in FIG. 3E. As a result, Gowreesh's client device 110 transmits a notification to the server 120 reporting that Gowreesh is merging two video conferences and providing their identity (e.g., their unique conference IDs).

Figure 3F:
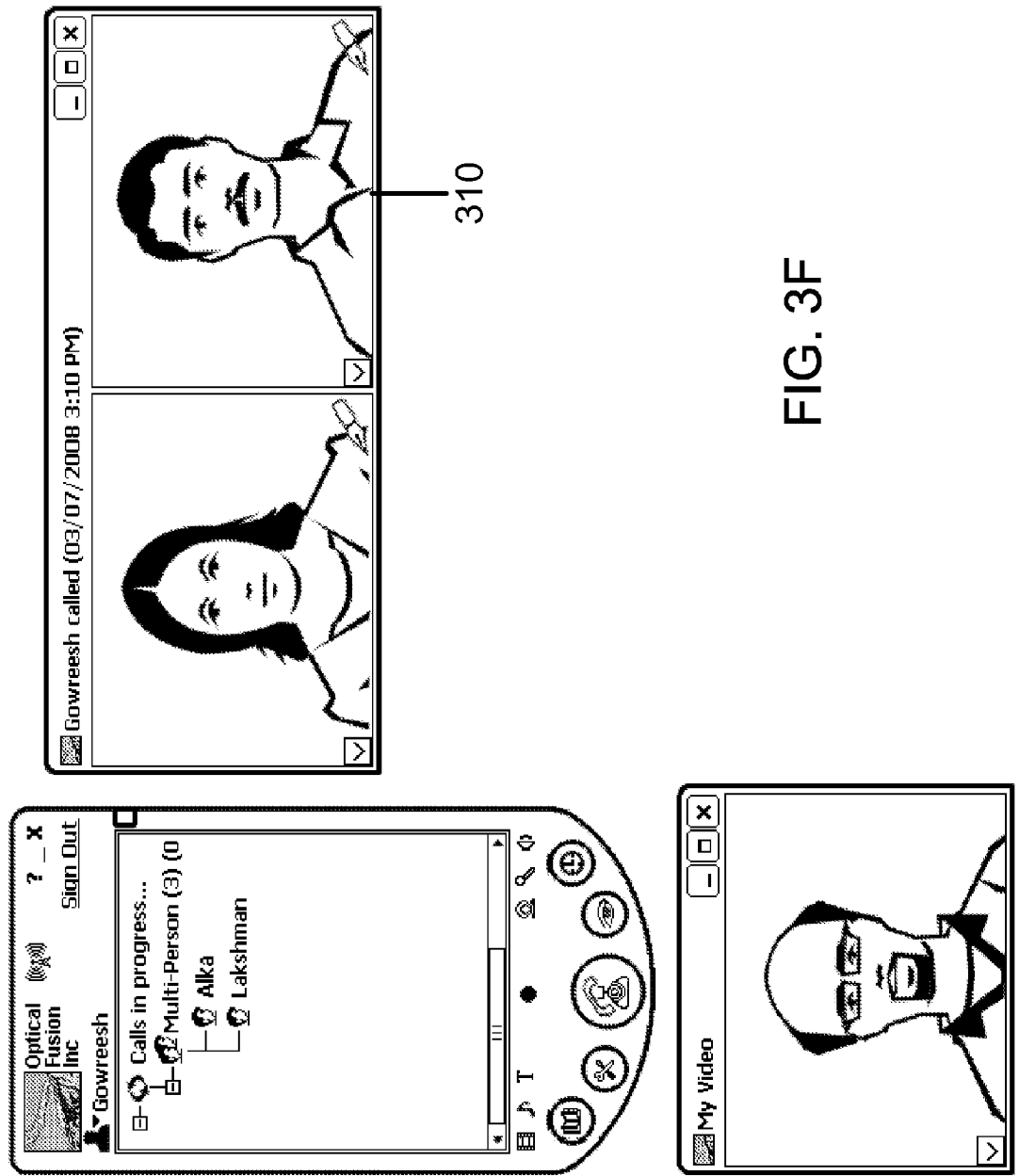

The server 120 combines the two video conferences by moving participant information (e.g., IDs, port numbers, etc.) in a conference table entry for a merged video conference, in this case the second video conference, into a conference table entry for a surviving video conference, in this case the first video conference. The server 120 may determine the video conference corresponding to the window being dragged as the merged video conference and the other the surviving video conference. As a result of this process, the server 120 activates Lakshman as a part of the first video conference by adding him into the list of active participants in the conference table entry for the first video conference and terminates the second vide conference. In addition, the server 120 checks whether the prior ports Lakshman used for attending the second video conference are still available. If the ports are available, the server 120 uses them to transmit media streams for the first video conference. Otherwise the server 120 works with Lakshman's client device 110 to determine ports for the first video conference. Once Lakshman joins the conference, the other participants 102 are notified that he has joined. The notification may be an audio signal, text message, or change in the list of participants. It may be simply that Lakshman now appears in the video conference window for the other participants. The server 120 also routes subsequent media streams to and from Lakshman's client device 110. FIG. 3F shows a screen shot of Gowreesh's client device after Lakshman joins the first conference. As shown, the window 310 now includes video for both Alka and Lakshman, and the window 340 is no longer displayed.

Other variations will be apparent. For example, instead of a participant of the previously established video conference making the second video conference call to the non-participant, the non-participant could make the video conference call to one of the participants. As another example, a user can merge two incoming video conference calls in a process similar to the process described above with respect to FIGS. 3A-3F.

In another variation, the second video conference effectively is automatically merged into the first one when established, such that it is not necessary for Gowreesh to manually combine the two video conferences. For example, assume Lakshman made a video conference call to Gowreesh. Rather than accepting the call, Gowreesh can drag the incoming call to the window (or tree node) for the first video conference. In this case, no second video conference is established. Rather, Lakshman is automatically included in the first video conference as a participant. During this process, the server 120 needs not set up the second video conference at all, and could just add Lakshman as a participant to the first video conference. Similarly, a participant can drag an outgoing call to include the party being called into an existing video conference. Alternately, a choice can be given to Gowreesh. A pop-up menu might ask Gowreesh, "Do you want the new user to join the existing video conference?" "Yes" means Lakshman would join the existing video conference. "No" means a separate video conference would be established.

The number of participants of the first video conference can also be large (e.g., more than ten) and one or more non-participants 102 may join the video conference after it is established. As another variation, the initiating caller (or other participants) of the first video conference can choose to allow or forbid new (or returning) participants from joining the first video conference. A common default may be to allow asynchronous joining of video conferences. Participants may also have the ability to limit participation rights of those who later join the video conference. For example, the caller (or other participants) might limit the participation of the new (or rejoining) participants to be for listening purposes only. Their access to the media content (e.g., video, audio, and/or text) generated or shared during their absence or before their joining might also be limited or restricted. For example, a meeting might have a private portion restricted to a very limited group of participants, followed by a public portion that is open to a larger group. New participants might join the video conference for the public portion, but they would be prohibited from accessing what occurred during the private portion. These restrictions preferably can be modified, including during a video conference.

This implementation provides users with the freedom to join, leave, and rejoin a video conference. In addition, this implementation also allows participants to resume attending a video conference after computer crashes (e.g., applications or operating system crash, hardware failure, power failure, etc.).

Process for Asynchronously Leaving a Video Conference

Participants 102 of a video conference can choose to leave the video conference before it is over. The departing participant can leave the video conference by clicking a leave button. For example, as shown in FIG. 2I, Gowreesh can click the leave button 297 to leave the video conference. After Gowreesh's departure, the video conference has two remaining participants, Alka and Lakshman.

The corresponding client device 110 of the departing participant 102 (e.g., Gowreesh's computer) sends a notification to the server 120 reporting the departure. The server 120 updates the conference table entry for the video conference by changing the status of the departed participant 102 from active to departed. The server 120 also stops routing media streams (e.g., video, audio, and/or text streams) of the video conference to and from the corresponding client 110. In addition, the server 120 notifies the other participants 102 (e.g., Alka and Lakshman) of the departure.

As described above with respect to FIGS. 3A-3F, a non-participant can join an on-going video conference through a video conference call with one of its participants. A departed participant can later rejoin a video conference following a similar process.

There can be additional features related to participants asynchronously leaving a video conference. For example, if the caller who initiated the video conference leaves, he could be given the option of allowing the video conference to continue with the remaining participants or ending the video conference for all.

Process for Merging multiple Video Conferences

A participant of multiple video conferences can merge two or more video conferences together in a simple and intuitive manner. This merging process can be implemented similar to the process described above for enabling a participant to invite a non-participating user to join an on-going video conference. The process of merging multiple video conferences is further illustrated through an example below with reference to FIGS. 4A-4F. For convenience, the process is described using the system and example shown in FIG. 1.

Figure 4A:
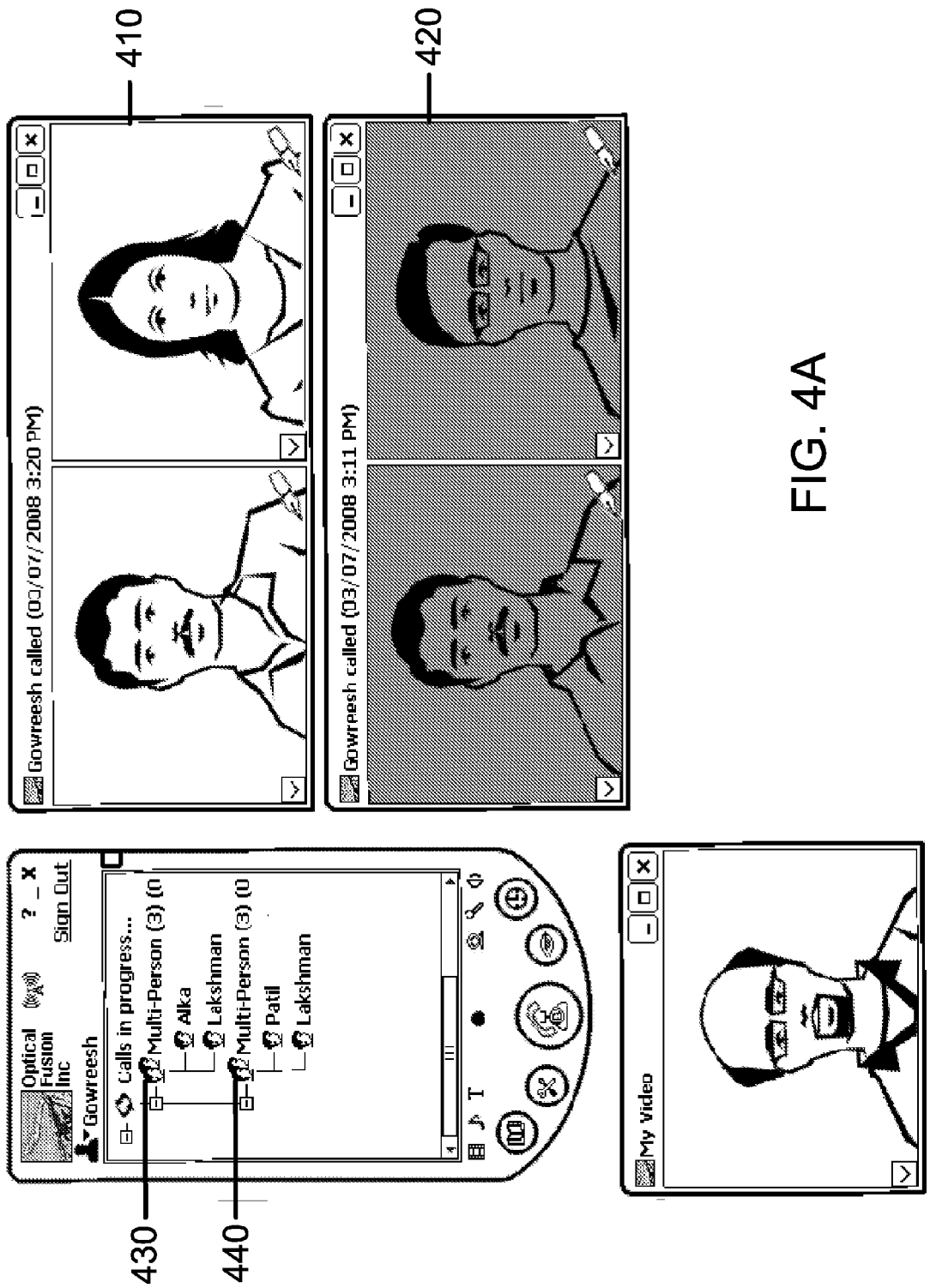
FIGS. 4A-4F are a series of screen shots illustrating a process for a user to merge two video conferences.

Initially, a first video conference has participants Gowreesh, Lakshman, and Alka, and a second video conference has participants Gowreesh, Lakshman, and Patil. Gowreesh and Lakshman are common participants in both video conferences. FIG. 4A shows a screen shot of Gowreesh's client device. As shown, videos from participants of the first video conference are played on a window 410, and videos from participants of the second video conference are played on a window 420. The communicator also displays tree nodes 430, 440 for the first and second video conferences along with their participants. Compare to the window 410 and the tree node 430, the window 420 and the tree node 440 are shaded, indicating that the first video conference is active and the second video conference is on hold.

Figure 4B:
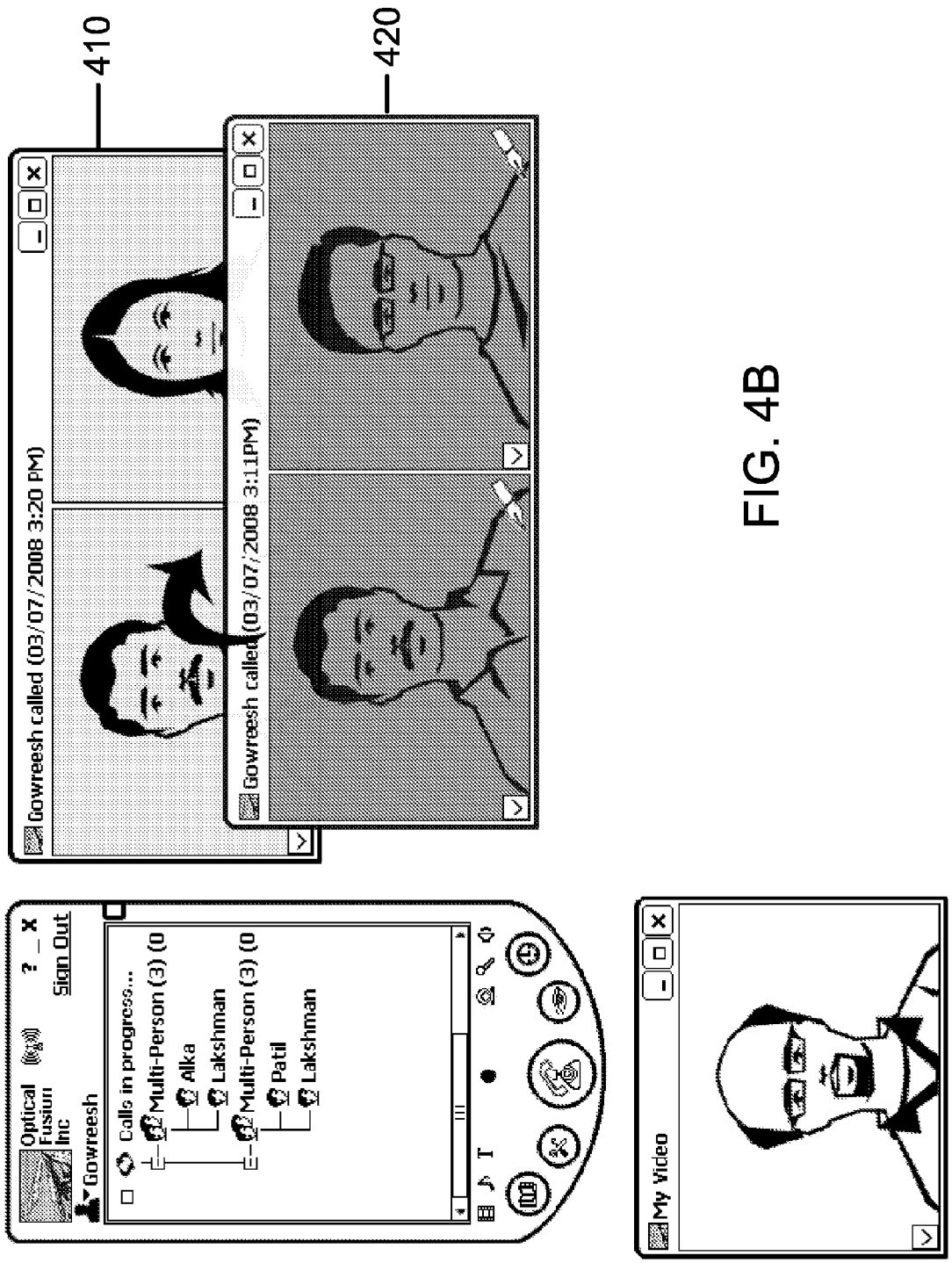
Figure 4C:
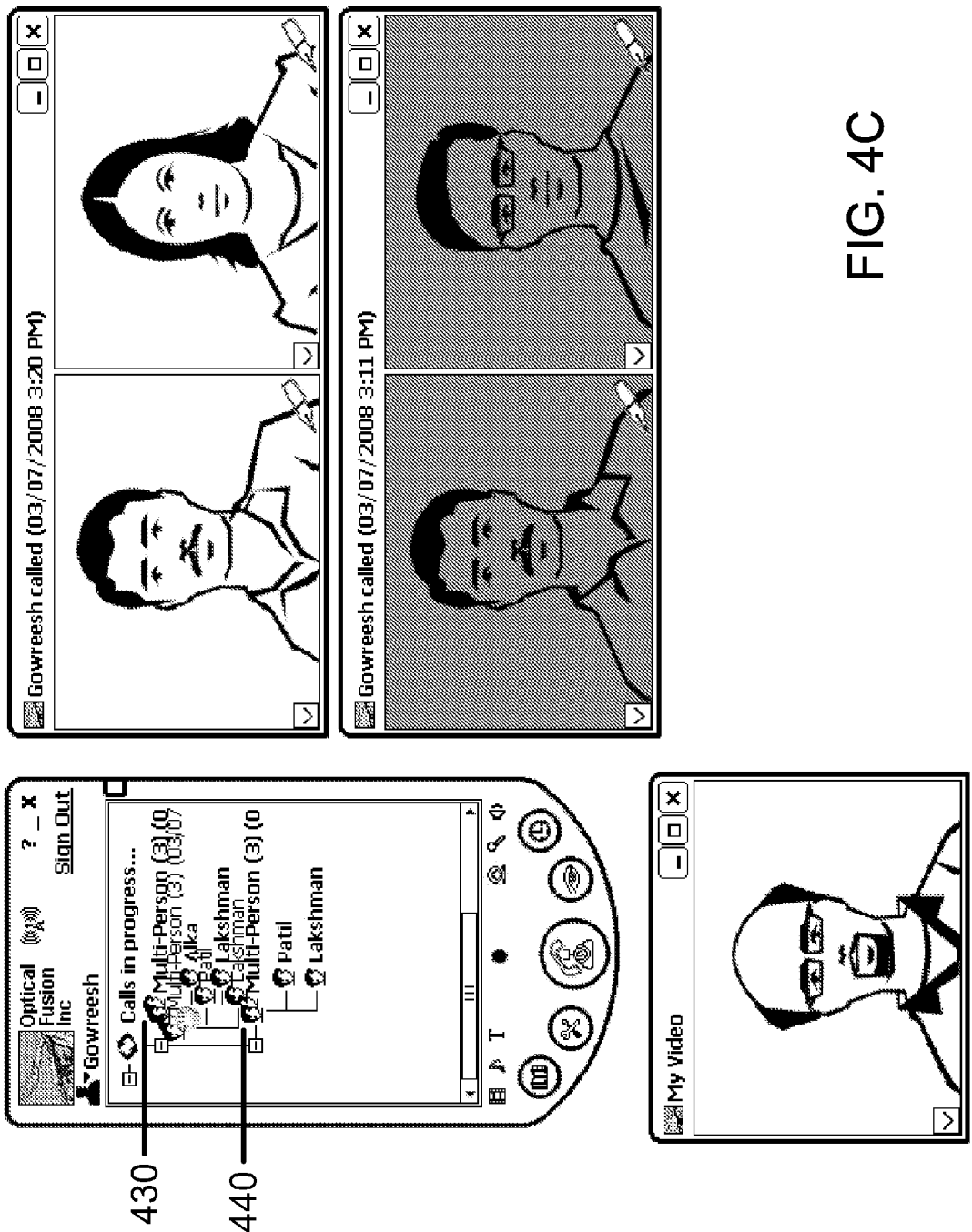

A common participant (e.g., Gowreesh, Lakshman) can merge the two video conferences by dragging the window (or the tree node) representing one video conference onto the window (or the tree node) representing the other video conference. This operation can be implemented in a manner similar to the process for a non-participant to join a video conference described above with respect to FIGS. 3A-3F. As shown in FIG. 4B, Gowreesh merges the two video conferences by dragging the window 420 onto the window 410. FIG. 4C shows Gowreesh merges the two video conferences by dragging the tree node 440 onto the tree node 430.

The server 120 combines the two video conferences by moving participant information (e.g., IDs, port numbers, etc.) in a conference table entry for a video conference (hereinafter called the merged video conference) into a conference table entry for the other video conference (hereinafter called the surviving video conference). The server 120 may determine the video conference Gowreesh actively participates as the surviving video conference and the one on-hold as the merged video conference. The server 120 may instead determine the video conference corresponding to the window being dragged as the merged video conference and the other the surviving video conference. Gowreesh may also specify the surviving video conference. Alternatively, the server 120 may create a new video conference, and moves all participants from both video conferences into a conference table entry for the new video conference. The server 120 removes duplicate participants (e.g., Gowreesh and Lakshman) in the list of active participants for the surviving video conference. As a result of this process, participant information for participants in both video conferences is under the conference ID of the surviving video conference.

Figure 4D:
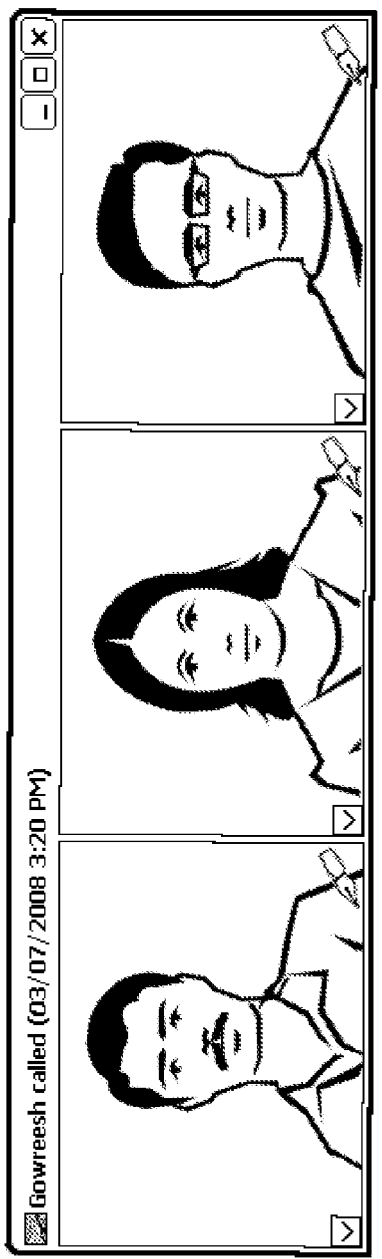
Figure 4D:
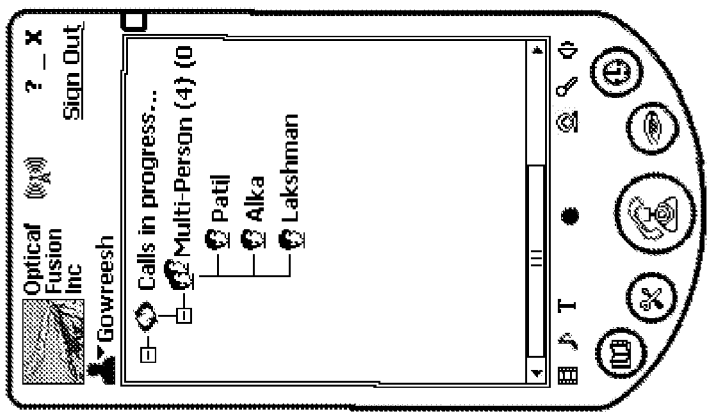
Figure 4D:
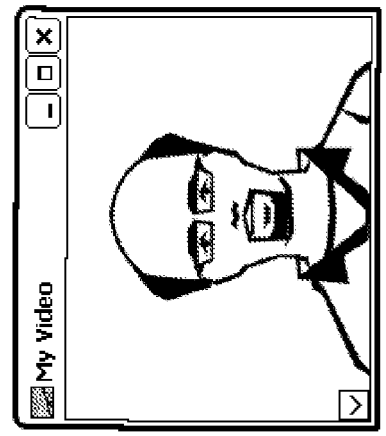
Figure 4E:
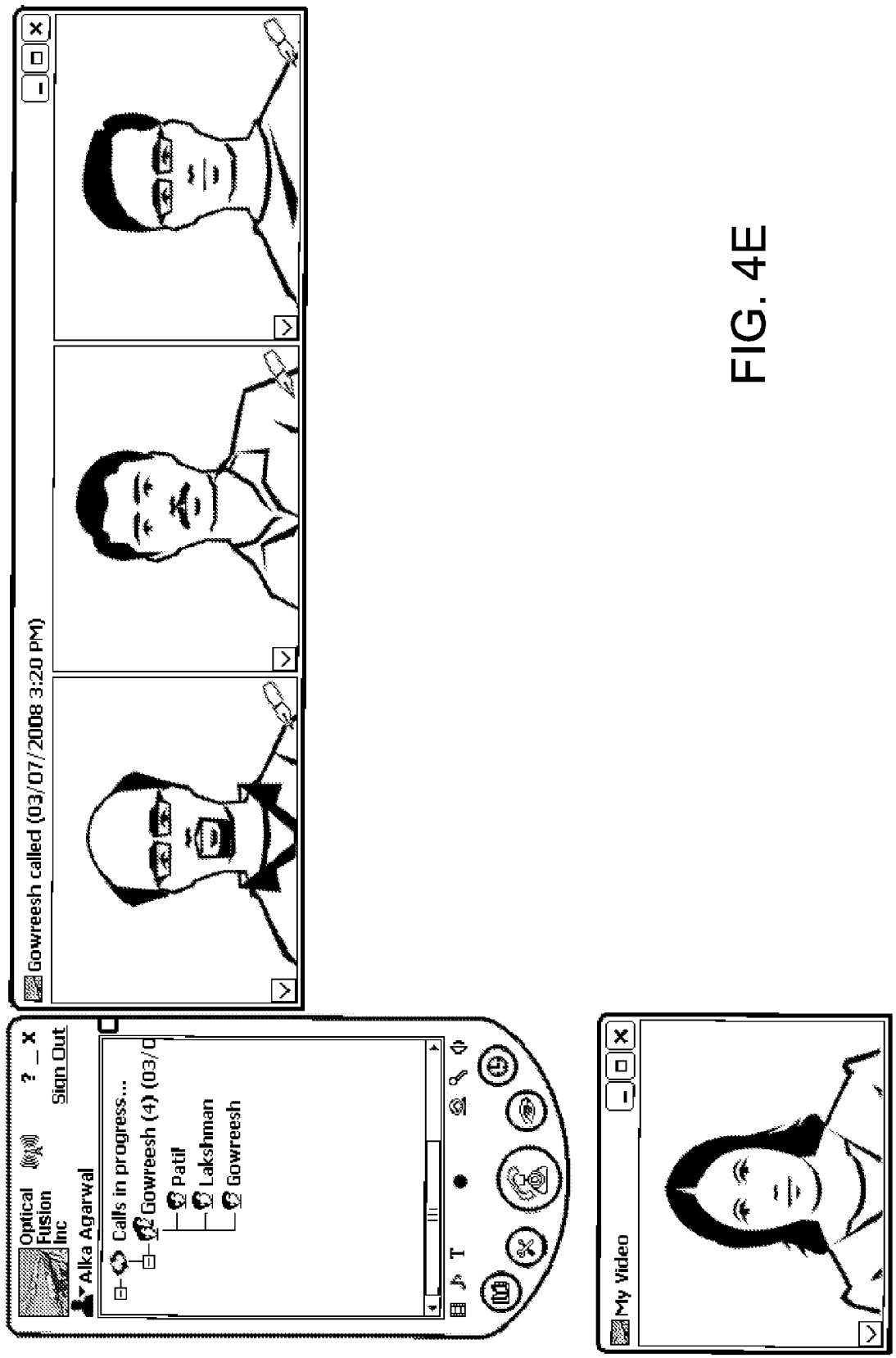
Figure 4F:
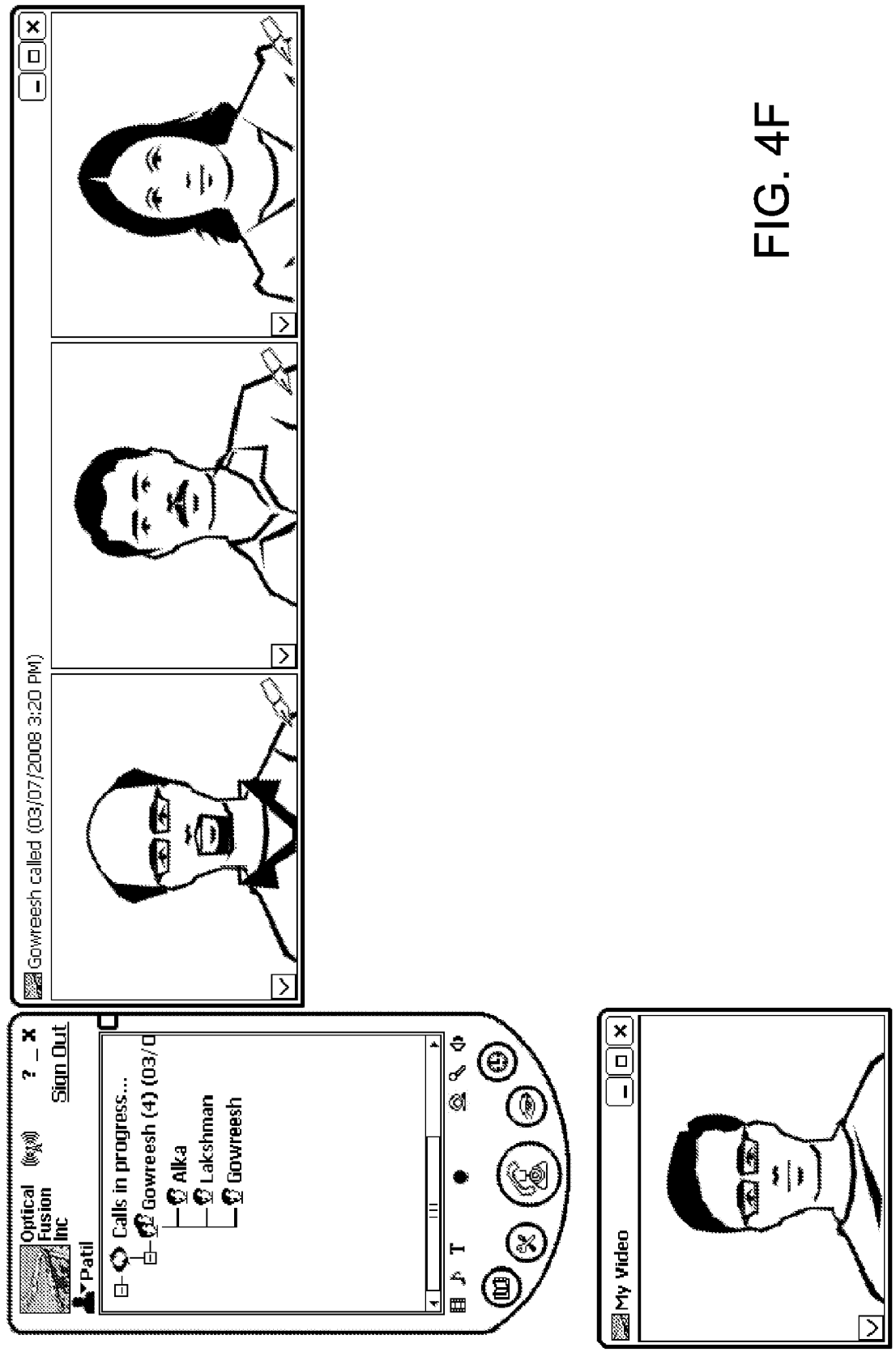

User experiences of participants 102 of the two video conferences may vary during the merging process. For those participating in both video conferences (e.g., Gowreesh and Lakshman), the merged video conference is terminated and removed from their display. In addition, the participants of the merged video conference are shown in the surviving video conference as additional participants. FIG. 4D shows a screen shot of Gowreesh's client device after the two video conferences are merged. For those participating in only the surviving video conference (e.g., Alka), the participant list is expanded in their displays to include the new participants from the other video conference. FIG. 4E shows a screen shot of Alka's client device after the two video conferences are merged. For those participating in only the merged video conference (e.g., Patil), their displays shows that the merged video conference is terminated and they join the surviving video conference. FIG. 4F shows a screen shot of Patil's client device after the two video conferences are merged.

FIGS. 4A-4F illustrate one example process for merging existing video conferences, but the invention is not limited to these specifics. For example, a user might merge any number of video conferences (or even merge all video conferences in which he is currently participating), and repeat the merger process to merge even more video conferences. As another example, the participant merging the video conferences may specify merging rules that may prohibit certain participants from joining the surviving video conference. For example, for billing purposes, a caller may specify that only paid participants are allowed to remain or join in a merged video conference. The other participants either are prohibited from joining or have only limited rights (e.g., listening only). In addition, the initiating callers of a video conference can limit the merging rights to certain users, or prohibit the video conference from being merged. For example, the caller may prohibit the called party from initiating a merger involving the caller, or limit the called party to only merge video conferences he currently participates. In one implementation, participants of merging video conferences are prompted of billing information of the surviving video conference, and are given an option to leave to avoid charges.

Figure 5A:
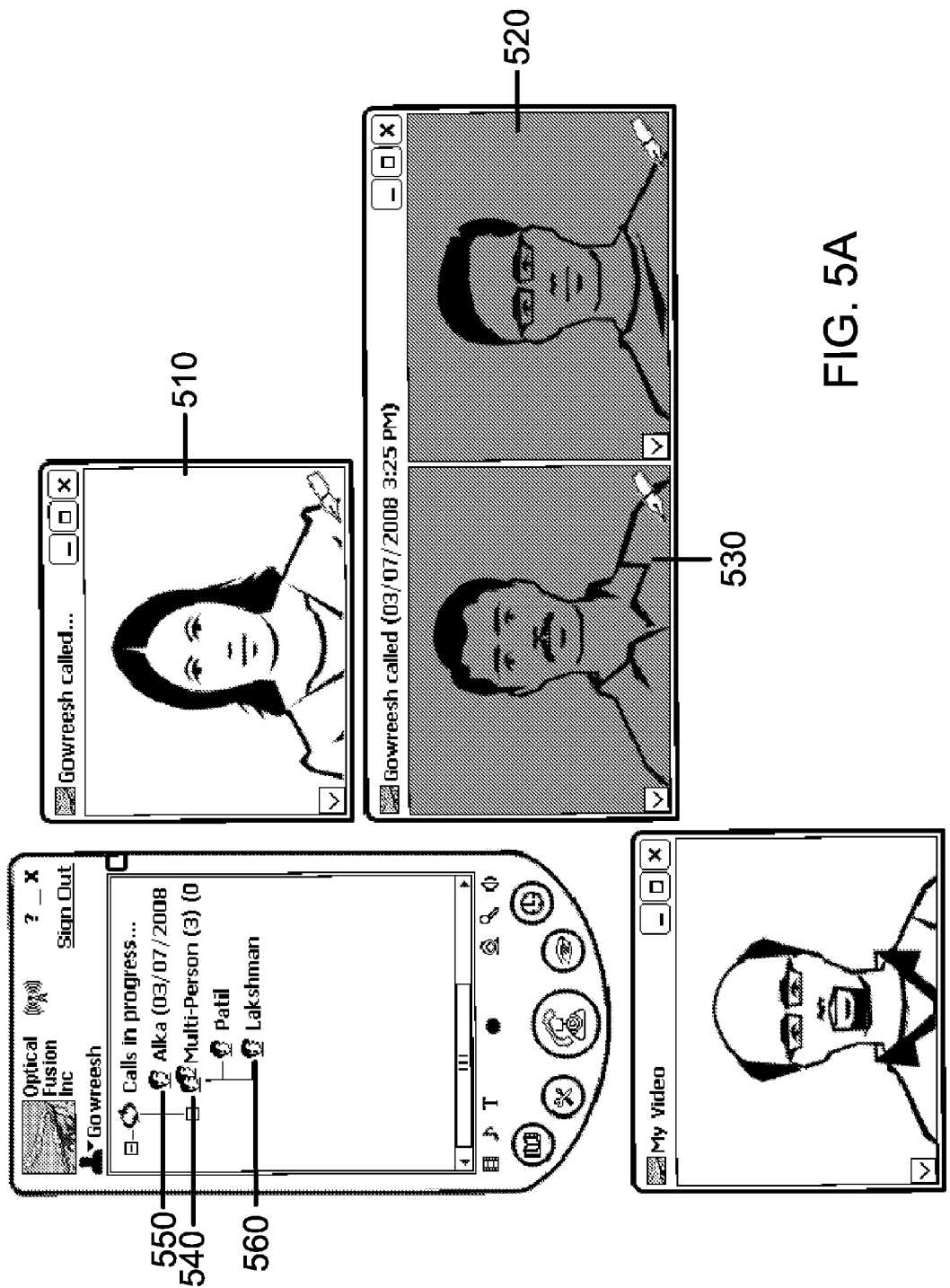
FIGS. 5A-5D are a series of screen shots illustrating a process for a user to merge some participants of one video conference into another video conference.
Figure 5B:
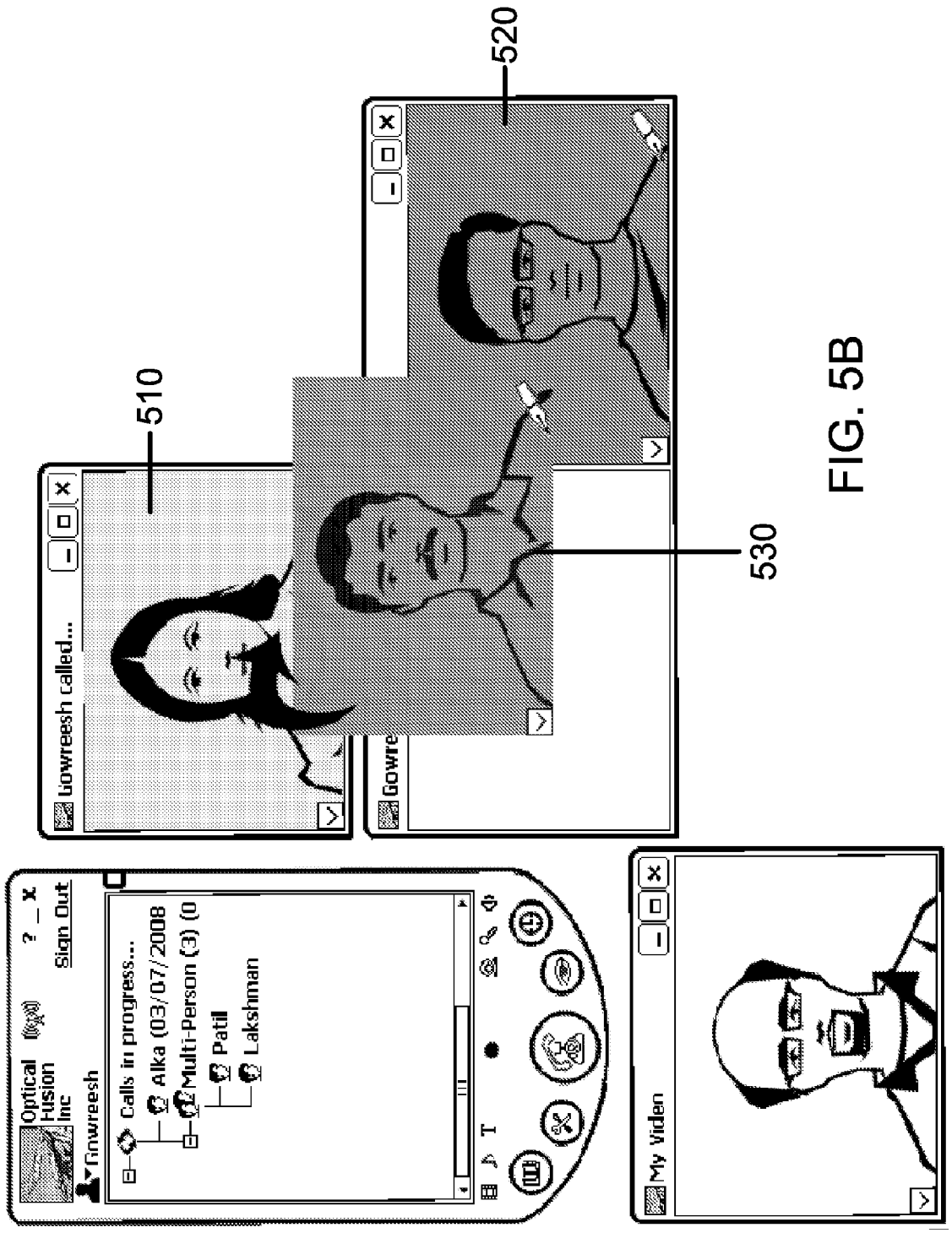
Figure 5C:
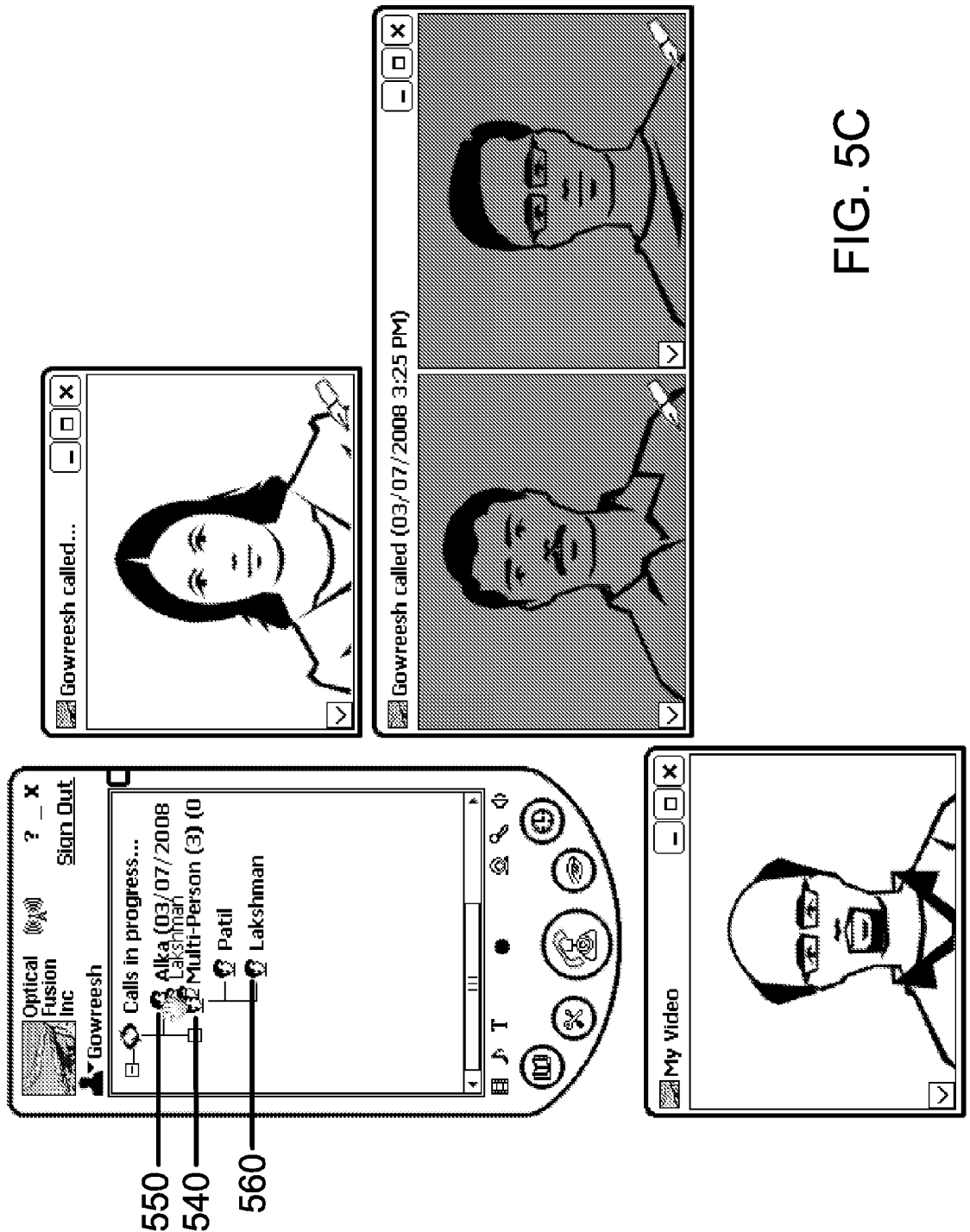
Figure 5D:
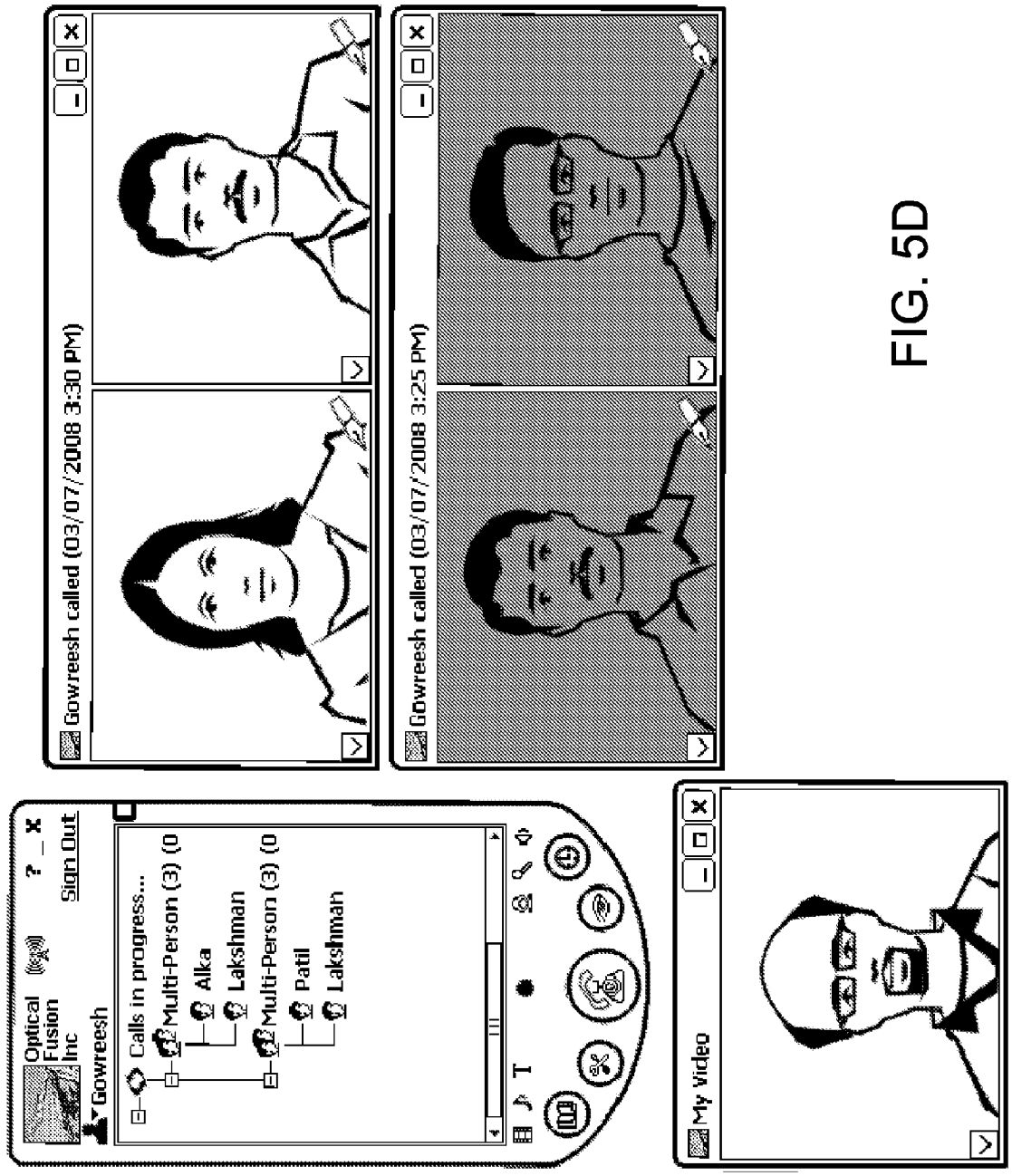

In one variation, rather than merging two video conferences, a user can selectively merge some participants of one video conference into another video conference. FIGS. 5A-5D illustrate one example of such a process. As illustrated in FIG. 5A, Gowreesh initially participates in two video conferences, a first video conference with Alka (video shown in window 510), and a second video conference with Lakshman and Patil (video shown in window 520). The first video conference is represented by a tree node 550 in the communicator and the second video conference is represented by a tree node 540. Rather than merging the two video conferences, which will results in a video conference including Gowreesh, Alka, Lakshman, and Patil, Gowreesh can selectively merge one participant (in this case Lakshman) from the second video conference into the first video conference. Gowreesh can do so by dragging Lakshman's video 530 from the window 520 onto the window 510, as illustrated by FIG. 5B. Alternatively, Gowreesh can merge Lakshman into the first video conference by dragging a child node 560 representing Lakshman onto the tree node 550, as illustrated by FIG. 5C. Either way, Lakshman becomes an active participant of the first video conference as a result. FIG. 5D shows a screen shot of Gowreesh's client device after Lakshman is merged into the first video conference.

Other mechanisms can also be used to merge video conference calls. For example, a bridging video conference call can be made between participants of two different video conferences to merge them. This can be useful if there is not a common participant. FIGS. 6A-6L illustrates an example of such a process.

Figure 6A:
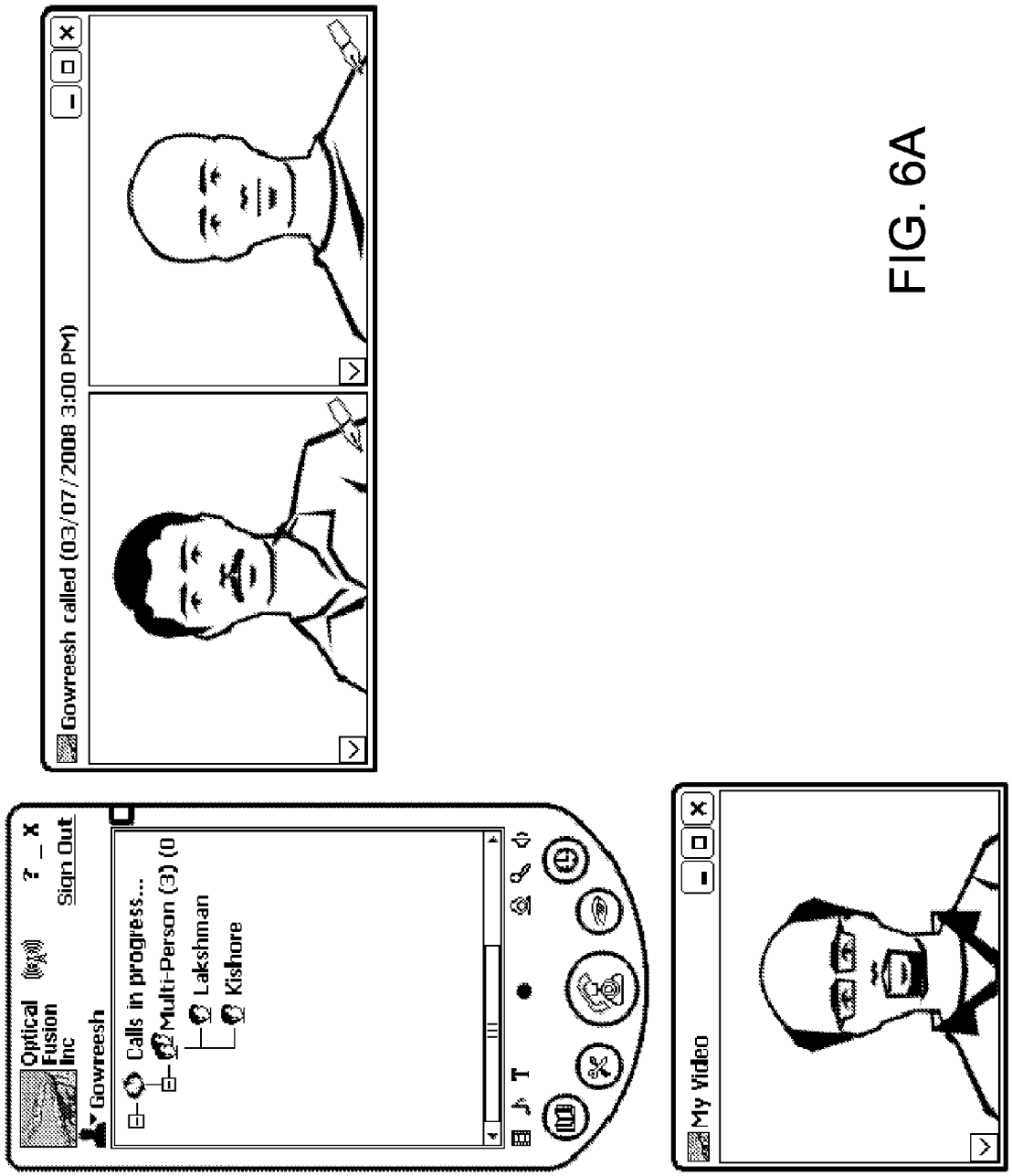
FIGS. 6A-6L are a series of screen shots illustrating a process for merging two video conferences through a bridging video conference.
Figure 6B:
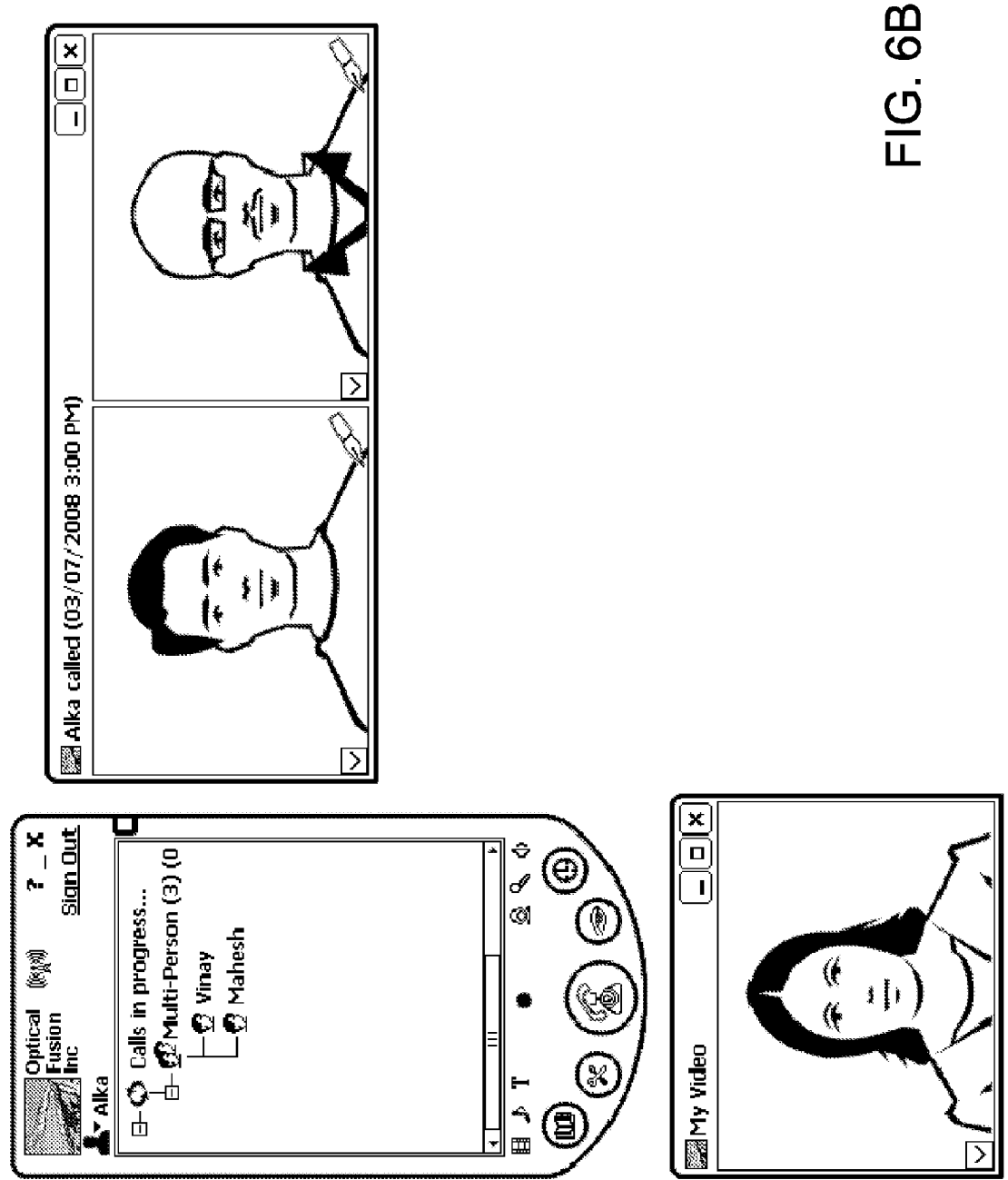
Figure 6C:
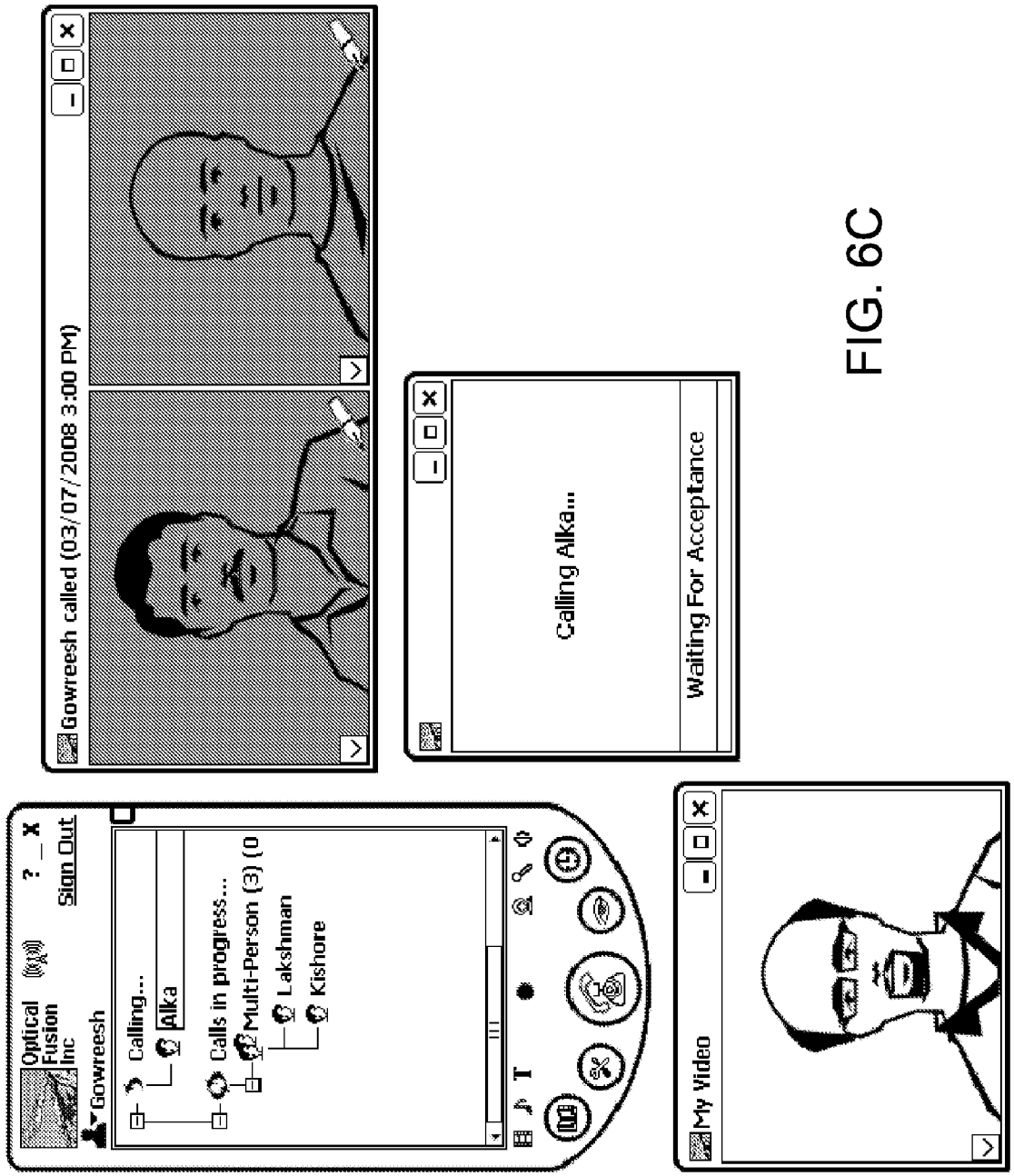
Figure 6D:
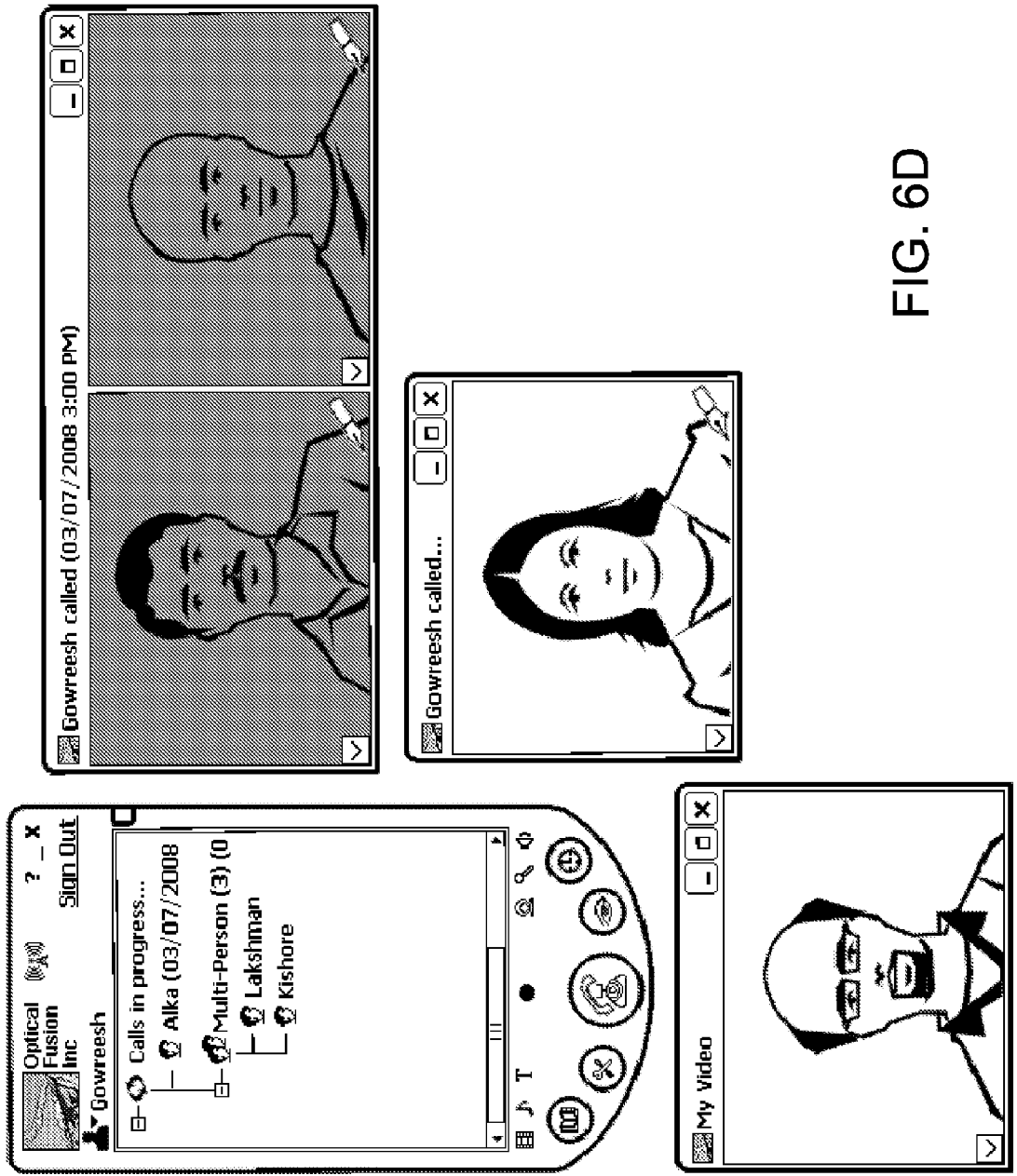
Figure 6E:
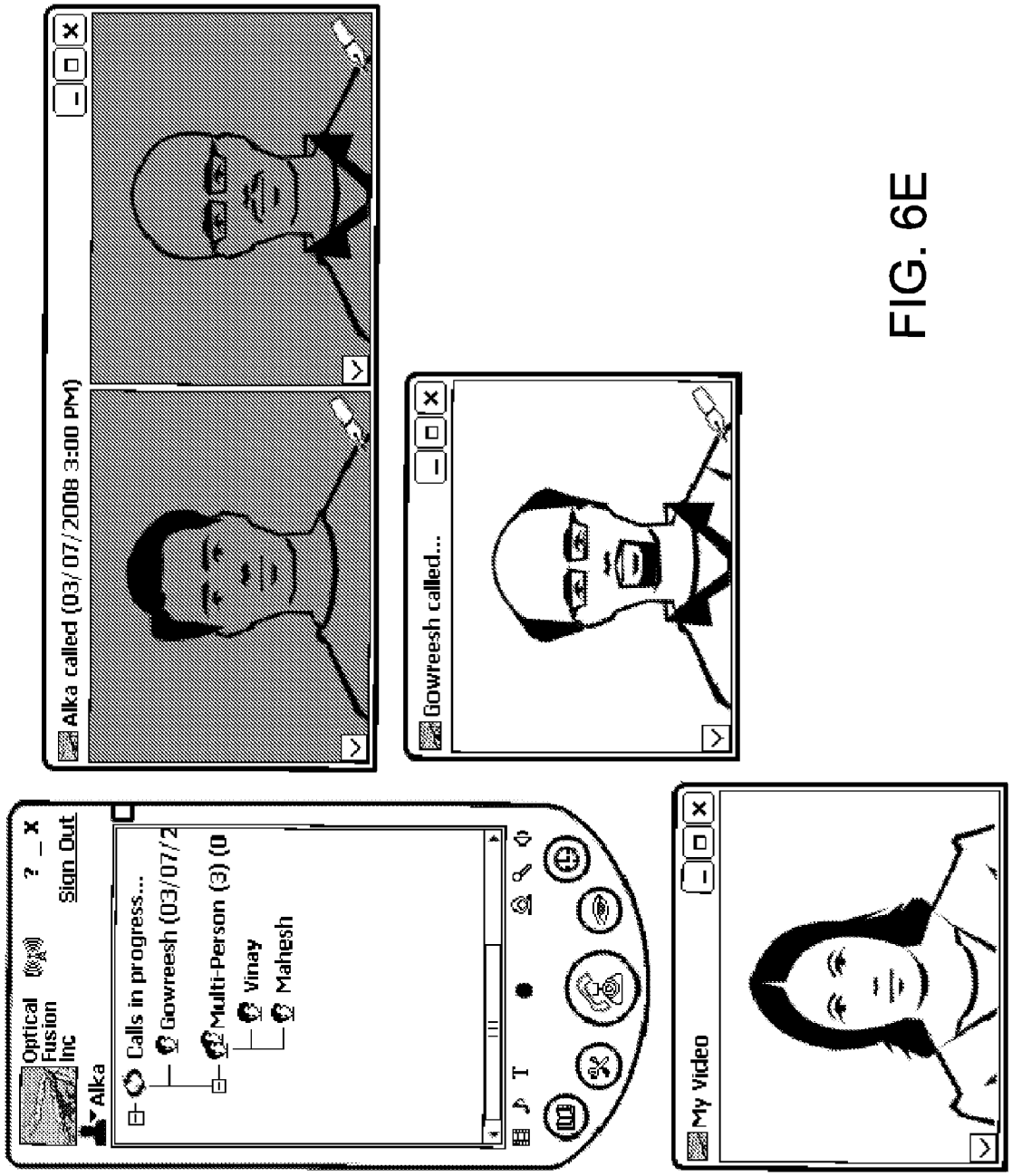
Figure 6F:
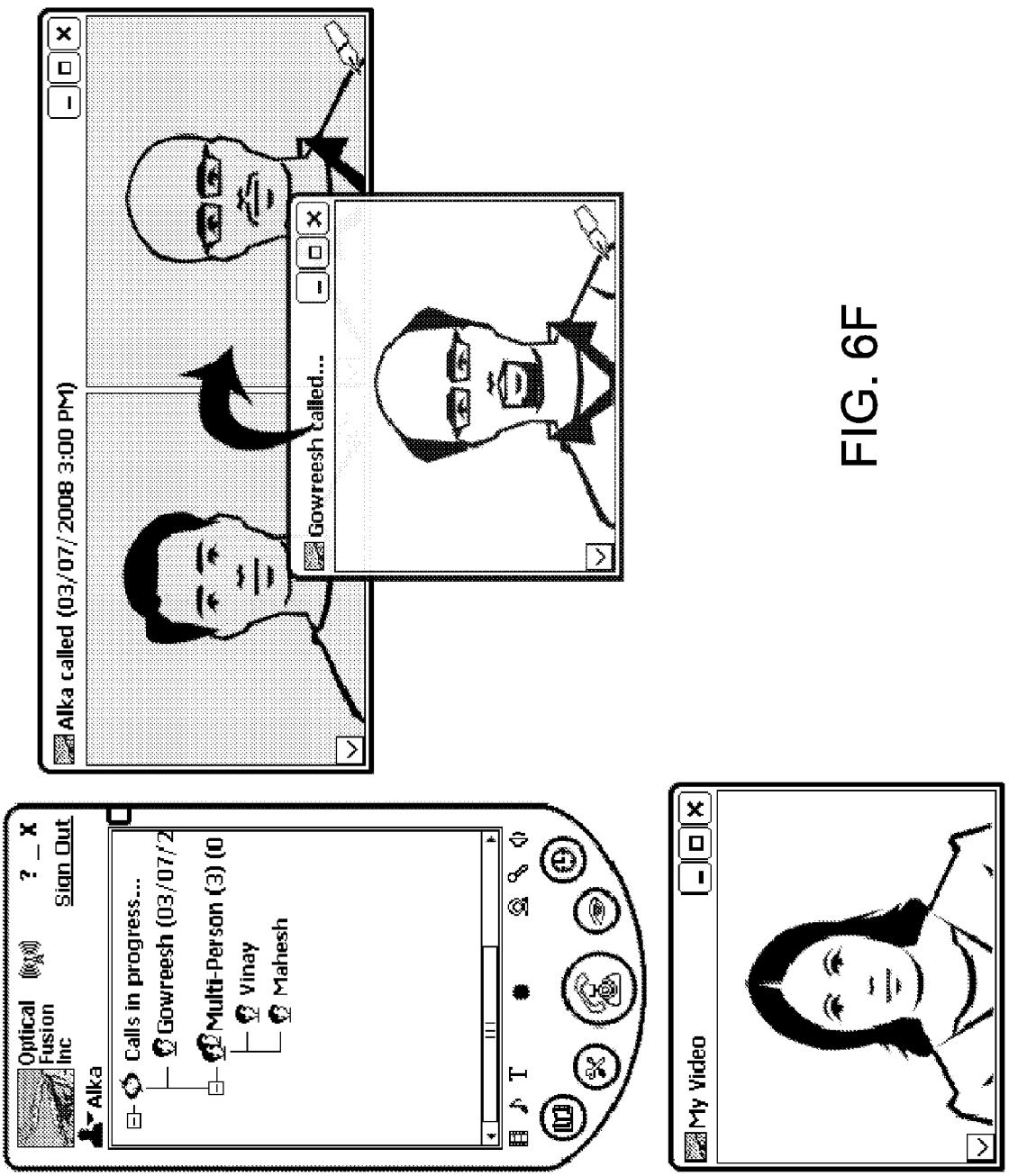
Figure 6G:
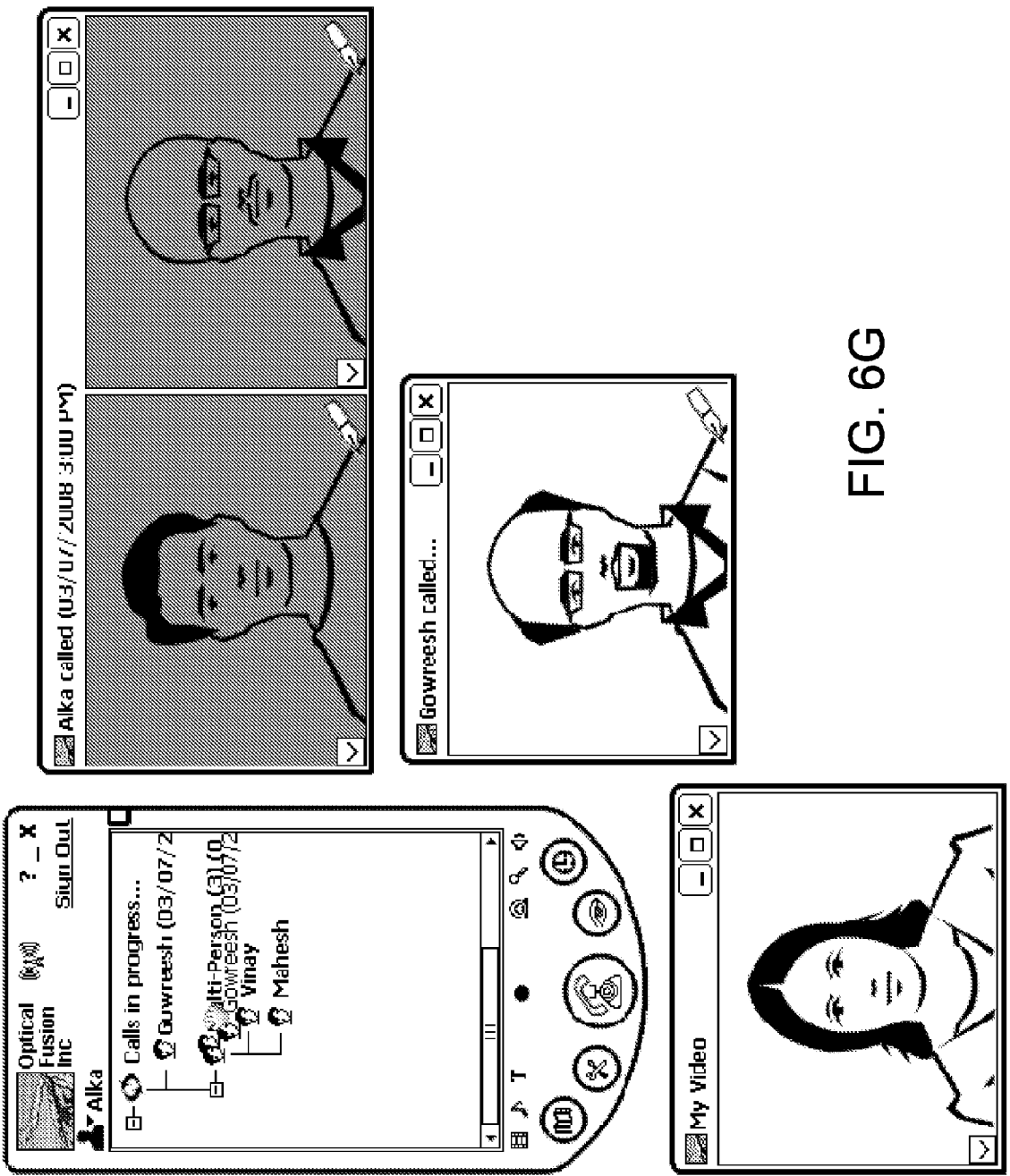
Figure 6H:
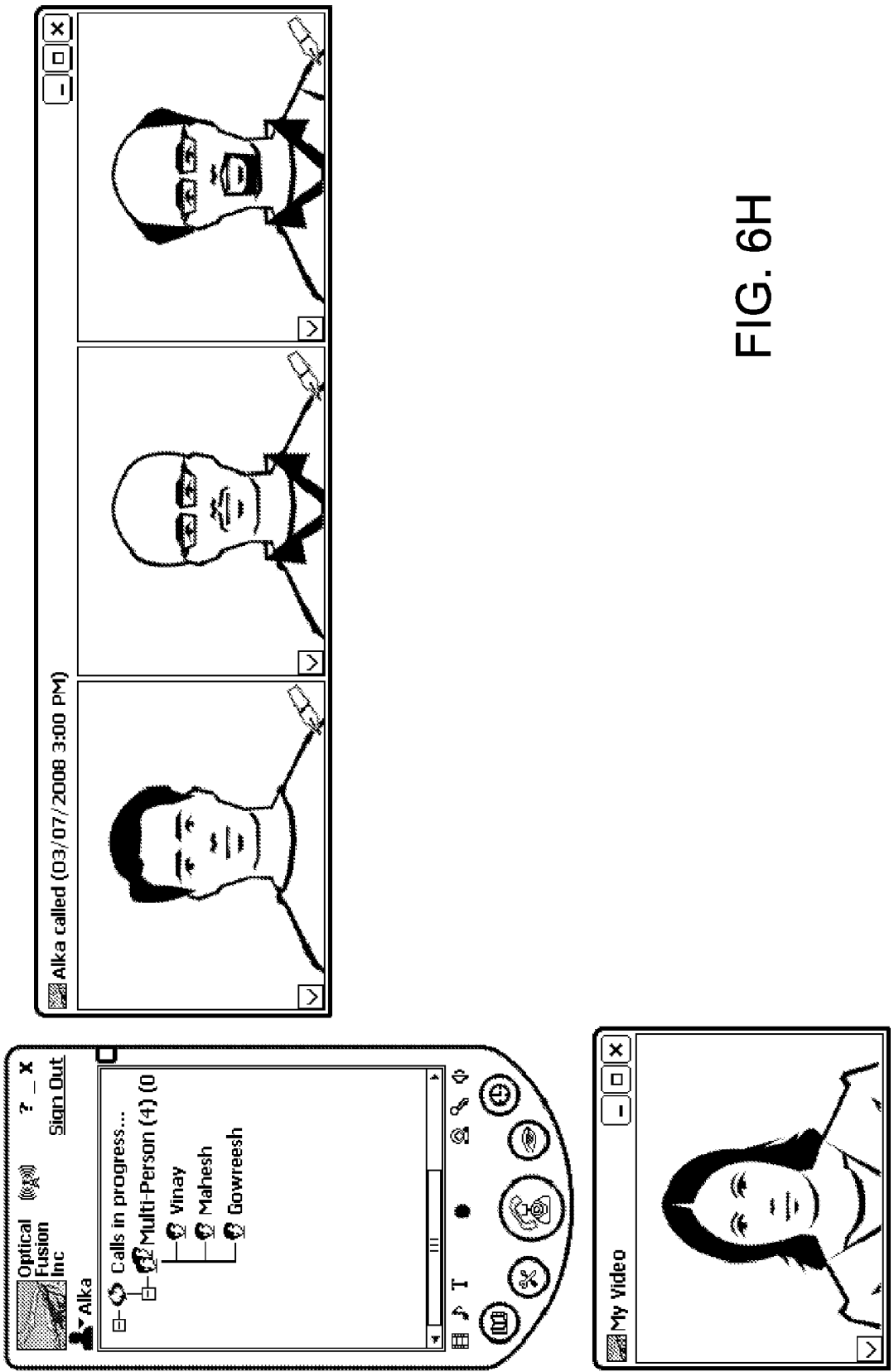
Figure 6I:
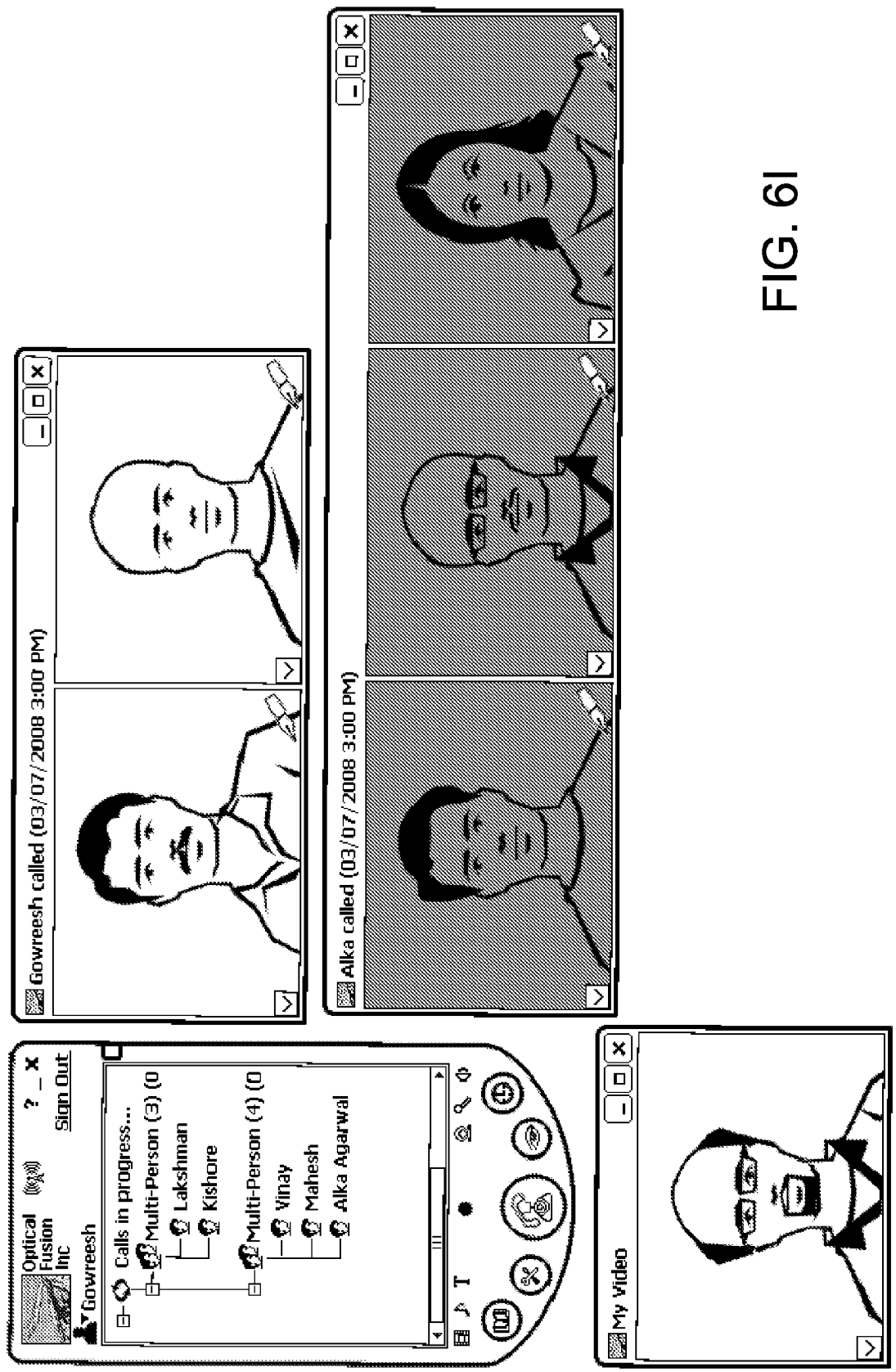
Figure 6J:
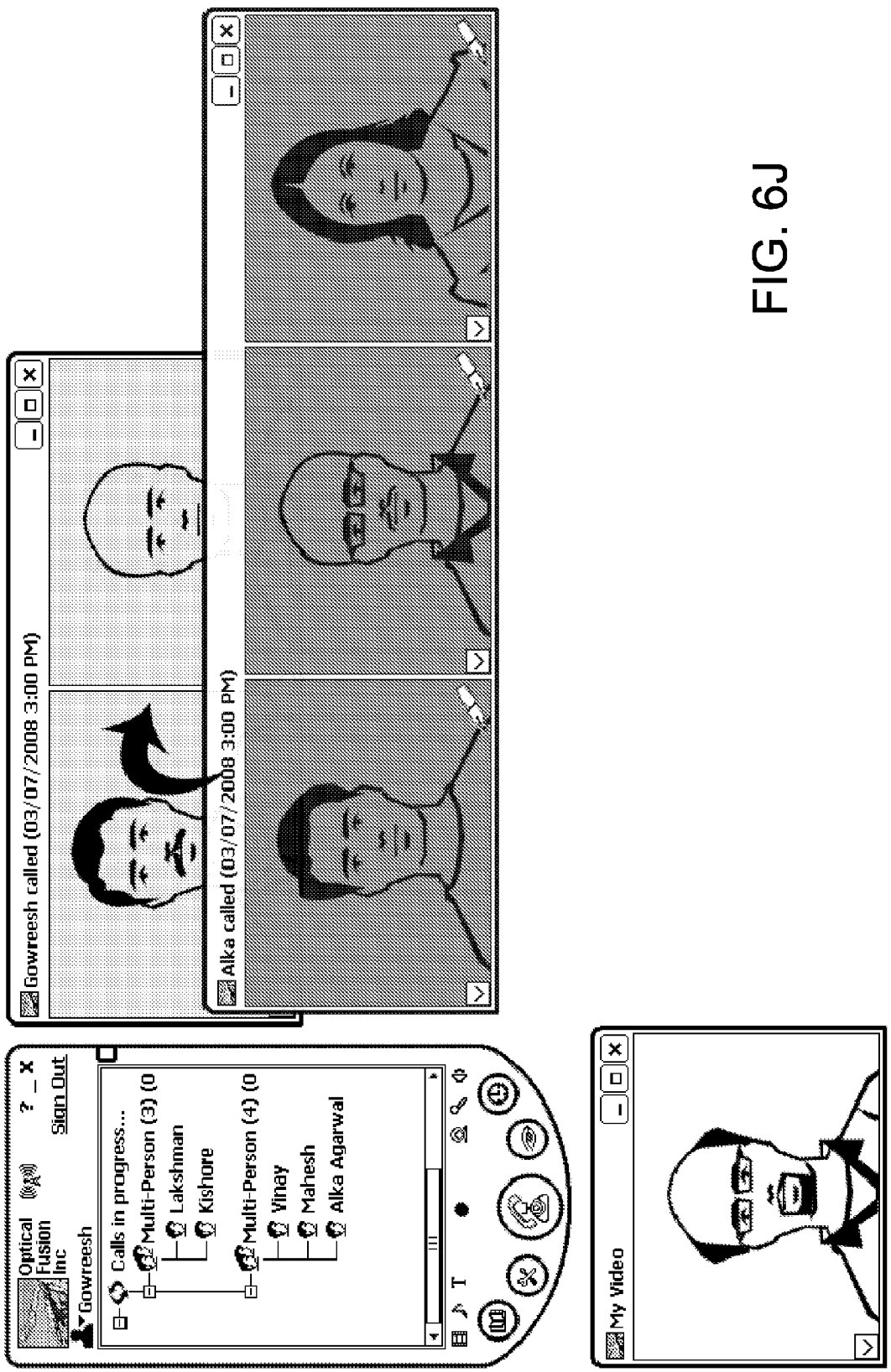
Figure 6K:
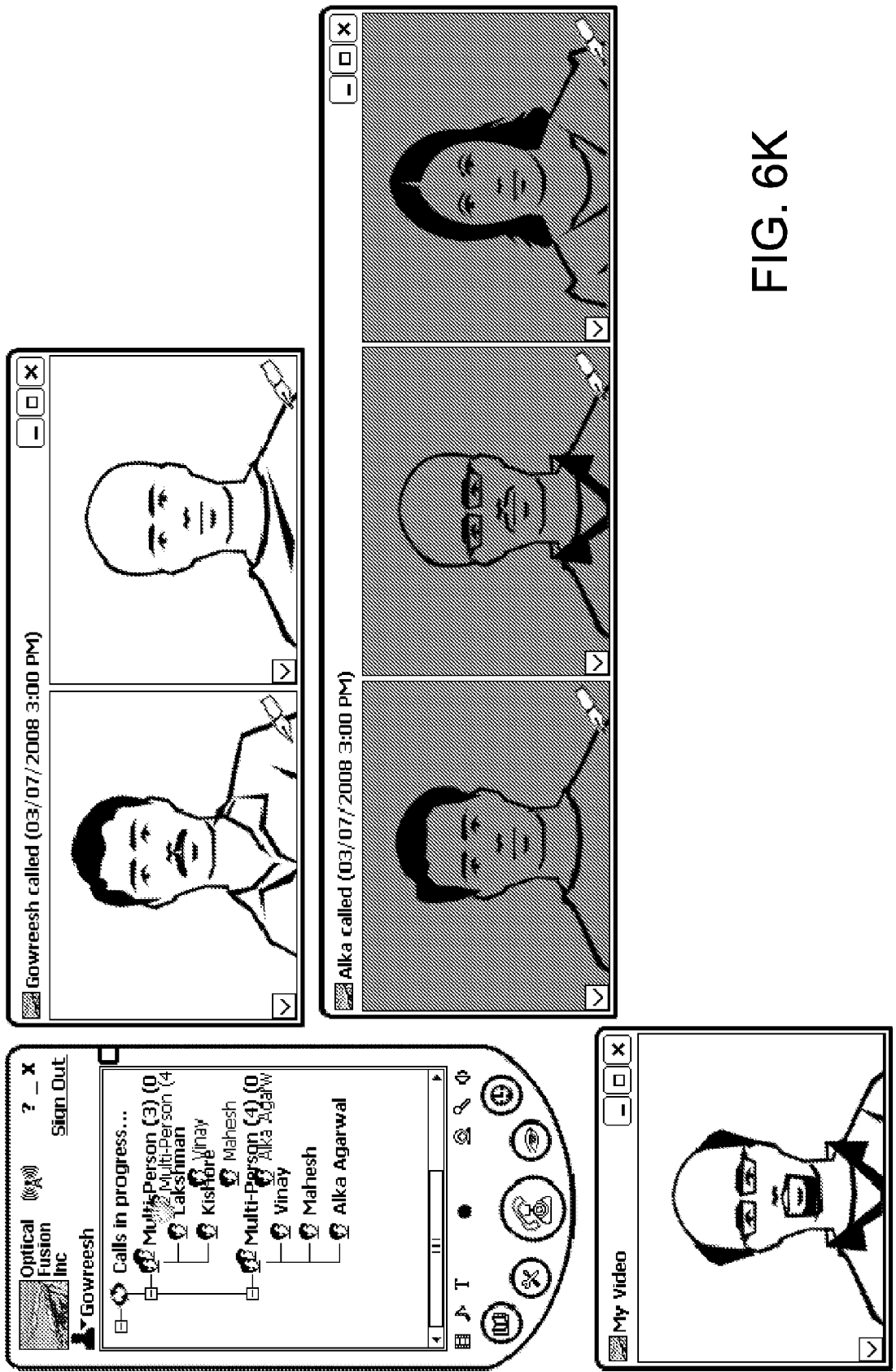
Figure 6L:
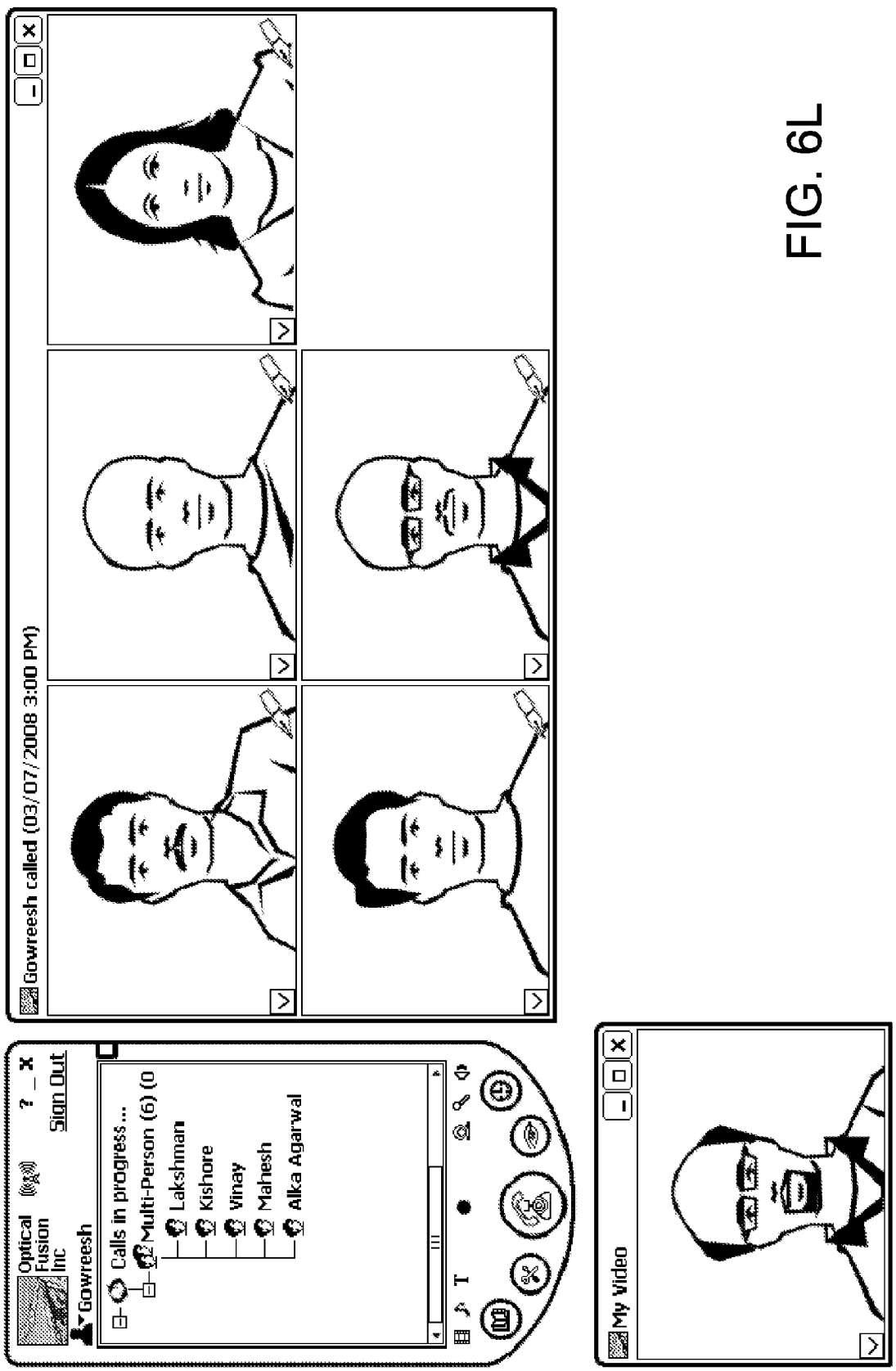

As illustrated in FIGS. 6A and 6B, initially there are two video conferences, a first video conference among Gowreesh, Lakshman, and Kishore, and a second video conference among Alka, Vinay, and Mahesh. There is no common participant between the first and the second video conferences. The two video conferences can be merged through a bridging video conference. As illustrated FIG. 6C, Gowreesh calls Alka to establish such a bridging video conference. Alka accepted the call and the bridging video conference is established. FIGS. 6D and 6E show screen shots of Gowreesh's client device and Alka's client device, respectively, after the bridging video conference is established. Alka merges the bridging video conference into the second video conference in a process similar to the process described above with respect to FIGS. 4A-4F. Alka can achieve the merger by dragging the window representing the bridging video conference, as illustrated by FIG. 6F, or dragging the tree node for the bridging video conference, as shown in FIG. 6G. FIGS. 6H and 6I show screen shots of Alka's client device and Gowreesh's client device, respectively, after the bridging video conference is merged into the second video conference. Gowreesh can then merge the two video conferences together in a process similar to the process Alka merged the bridging video conference and the second video conference, as illustrated in FIGS. 6J and 6K. FIG. 6L shows a screen shot of Gowreesh's client device after the two video conferences are merged together. As shown, the surviving video conference includes all six participants from the initial first and second video conferences.

As a final variation, video conferences can be split in addition to merged. For example, one of the participants might select a subset of participants from the participant list and then activate the split feature. This would split the existing video conference into one video conference with the selected participants and another video conference with the other participants. In variations of this, the participant list can be split into multiple video conferences and/or participants can participate in more than one video conference after the split.

The history of merges and splits can also be recorded to facilitate future merges and splits. Alternately, various merges and splits may be predefined. For example, assume two companies are negotiating a contract. Company A's negotiation team has members CEO A1, CFO A2, CTO A3 and general counsel A4. Company B's negotiation team has members CEO B1, CFO B2, CTO B3 and general counsel B4. Assume everyone is participating by video conference. The negotiations might start as two video conferences for internal discussions: the "Company A" video conference that includes A1, A2, A3 and A4, and the "Company B" video conference that includes B1, B2, B3 and B4. After half an hour, the two video conferences are merged into the "Full Negotiation" video conference to allow negotiation between the full teams. This proceeds for two hours and then Company A would like to have another internal discussion. The "Full Negotiation" video conference is then split back into "Company A" and "Company B" video conferences. This may repeat several times over the course of the negotiation. Hence, preprogrammed merges and splits would be useful. Alternately, a history of merges and splits would also be useful, allowing the participants to repeat or to undo previous merges and splits. Other combinations would also be useful. Perhaps there is a finance issue and the two CFO's break off from the main group to have their own discussion. A little later, the remaining six participants break into A and B teams but without the CFOs. Later, all participants rejoin the "Full Negotiation" scenario. It is noted that participants can use additional features of the present invention to address their needs. For example, the two CFOs can engage in private conversation or text chat to exchange opinions, or initiate a separate video conference, while the other participants are actively engaged in the "Full Negotiation" video conference.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for merging open video conferences, the method comprising:
 a first caller making a first video conference call to one or more first called parties;
 upon acceptance of the first video conference call by at least one of the first called parties, establishing a first video conference with the first caller and the accepting first called parties as participants;
 a second caller making a second video conference call different from the first video conference call to one or more second called parties;

upon acceptance of the second video conference call by at least one of the second called parties, establishing a second video conference with the second caller and the accepting second called parties as participants, the first and second video conferences having at least one common participant;

during the first and second video conferences, the common participant merging the first video conference and the second video conference into a single combined video conference, the single combined video conference having at least three participants.

2. The method of claim 1, wherein either of the first and second video conferences have at least three participants.

3. The method of claim 1, further comprising:
the common participant merging all video conferences in which he is participating into a single combined video conference.

4. The method of claim 1, further comprising:
notifying participants of the first and second video conferences that the video conferences have been merged.

5. The method of claim 1 wherein at least one of the participants of one of the video conferences may prohibit other participants from participating in the combined video conference.

6. The method of claim 5 wherein at least one of the first and second callers may prohibit other participants from participating in the combined video conference.

7. The method of claim 1 wherein at least one of the participants of one of the video conferences may limit other participants' rights to participate in the combined video conference.

8. The method of claim 7 wherein at least one of the first and second callers may limit other participants' rights to participate in the combined video conference.

9. A computer-implemented method for merging open video conferences, the method comprising:
a first caller making a first video conference call to one or more first called parties;
upon acceptance of the first video conference call by at least one of the first called parties, establishing a first video conference with the first caller and the accepting first called parties as participants;
a second caller making a second video conference call different from the first video conference call to one or more second called parties;
upon acceptance of the second video conference call by at least one of the second called parties, establishing a second video conference with the second caller and the accepting second called parties as participants;
during the first and second video conferences, one of the participants of the first video conference acting as a bridging caller making a bridging video conference call to a receiving participant of the second video conference, the bridging video conference call having at least one participant from each of the first and second video conferences; and
upon acceptance of the bridging video conference call:
the bridging caller merging the bridging conference call with the first video conference to create a first combined video conference, and
the receiving participant of the second video conference merging the second video conference with the first combined conference to create a single combined video conference.

10. The method of claim 9, wherein either of the first and second video conferences have at least three participants.

11. The method of claim 9, further comprising:
a third caller making a third video conference call to one or more third called parties;
upon acceptance of the third video conference call by at least one of the third called parties, establishing a third video conference with the third caller and the accepting third called parties as participants;
during the third and the single combined video conferences, one of the participants of one of the video conferences acting as an additional bridging caller making a second bridging video conference call to a second receiving participant of the single combined video conference; and
upon acceptance of the second bridging video conference call, the second bridging caller merging the second bridging conference call and the second combined video conference into a single further combined video conference.

12. The method of claim 9, further comprising:
notifying participants of the first and second video conferences that the video conferences have been merged.

13. The method of claim 9, wherein the common participant selectively merges a subset of participants in the first video conference or the second video conference into the single combined video conference.

14. The method of claim 9 wherein at least one of the participants of one of the video conferences may prohibit other participants from participating in the single combined video conference.

15. The method of claim 14 wherein at least one of the first and second callers may prohibit other participants from participating in the single combined video conference.

16. The method of claim 9 wherein at least one of the participants of one of the video conferences may limit other participants' rights to participate in the single combined video conference.

17. The method of claim 16 wherein at least one of the first and second callers may limit other participants' rights to participate in the single combined video conference.

* * * * *